US012792278B2

(12) United States Patent
Matsubara et al.

(10) Patent No.: US 12,792,278 B2
(45) Date of Patent: *Nov. 10, 2026

(54) IMAGE PROCESSING SYSTEM, NON-TRANSITORY COMPUTER READABLE MEDIUM STORING PROGRAM, AND IMAGE PROCESSING METHOD FOR GENERATING STEREOSCOPIC IMAGE DATA

(71) Applicant: FUJIFILM Business Innovation Corp., Tokyo (JP)

(72) Inventors: Koichi Matsubara, Kanagawa (JP); Yuichi Nishikuni, Kanagawa (JP); Shinya Takaishi, Kanagawa (JP); Daichi Kurotsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,098

(22) Filed: Aug. 16, 2023

(65) Prior Publication Data

US 2024/0319929 A1 Sep. 26, 2024

(30) Foreign Application Priority Data

Mar. 24, 2023 (JP) ................................ 2023-048898

(51) Int. Cl.
*G06F 3/12* (2006.01)
*G06K 15/02* (2006.01)
*G06T 15/50* (2011.01)

(52) U.S. Cl.
CPC .......... *G06F 3/1208* (2013.01); *G06F 3/1256* (2013.01); *G06K 15/1872* (2013.01); *G06T 15/506* (2013.01)

(58) Field of Classification Search
USPC ........................................................ 358/3.24
See application file for complete search history.

(56) References Cited

U.S. PATENT DOCUMENTS 7,380,208 B2 5/2008 Ishii et al.
2009/0154827 A1* 6/2009 Hanamoto ........... H04N 1/6097 382/260

(Continued)

FOREIGN PATENT DOCUMENTS

JP 4168748 10/2008
JP 2020052483 4/2020

OTHER PUBLICATIONS

"Search Report of Europe Counterpart Application", issued on Jan. 23, 2024, p. 1-p. 8.

*Primary Examiner* — Jacky X Zheng
(74) *Attorney, Agent, or Firm* — JCIPRNET

(57) ABSTRACT

An image processing system includes a processor configured to generate stereoscopic image data including information representing a layer thickness of an image forming material adhered to a recording medium based on image data of a printed image and cause a display unit to display a preview image of a printed matter based on the stereoscopic image data, in which the information representing the layer thickness of the image forming material includes information representing an aspect in which an edge of a swelling portion of the image forming material is inclined toward a recording medium surface or an aspect in which the edge of the swelling portion of the image forming material is rounded.

16 Claims, 17 Drawing Sheets

(56) References Cited

U.S. PATENT DOCUMENTS

| | | | | |
|---|---|---|---|---|
| 2017/0282608 | A1* | 10/2017 | Valade | B33Y 10/00 |
| 2024/0319938 | A1* | 9/2024 | Matsubara | G06F 3/1256 |

* cited by examiner

FIG. 5

70

| INPUT DENSITY [%] | | | | | FILM THICKNESS [um] |
|---|---|---|---|---|---|
| Y | M | C | K | SPECIAL TONER | |
| 0 | 0 | 0 | 0 | 0 | 0 |
| 0 | 0 | 0 | 0 | 12.5 | 0.5 |
| 0 | 0 | 0 | 0 | 25 | 1.2 |
| • • • | • • • | • • • | • • • | • • • | • • • |
| 100 | 100 | 100 | 100 | 100 | 27.5 |

FIG. 7A

CLEAR x UNCOATED 70A

| INPUT DENSITY [%] | | | | | FILM THICKNESS [um] |
|---|---|---|---|---|---|
| Y | M | C | K | CLEAR | |
| 0 | 0 | 0 | 0 | 0 | 0 |
| 0 | 0 | 0 | 0 | 12.5 | 0.3 |
| 0 | 0 | 0 | 0 | 25 | 0.8 |
| ... | ... | ... | ... | ... | ... |
| 100 | 100 | 100 | 100 | 100 | 24 |

FIG. 7B

WHITE x UNCOATED 70B

| INPUT DENSITY [%] | | | | | FILM THICKNESS [um] |
|---|---|---|---|---|---|
| Y | M | C | K | WHITE | |
| 0 | 0 | 0 | 0 | 0 | 0 |
| 0 | 0 | 0 | 0 | 12.5 | 0.5 |
| 0 | 0 | 0 | 0 | 25 | 1.3 |
| ... | ... | ... | ... | ... | ... |
| 100 | 100 | 100 | 100 | 100 | 29 |

FIG. 7C

CLEAR x COATED 70C

| INPUT DENSITY [%] | | | | | FILM THICKNESS [um] |
|---|---|---|---|---|---|
| Y | M | C | K | CLEAR | |
| 0 | 0 | 0 | 0 | 0 | 0 |
| 0 | 0 | 0 | 0 | 12.5 | 0.5 |
| 0 | 0 | 0 | 0 | 25 | 1.2 |
| ... | ... | ... | ... | ... | ... |
| 100 | 100 | 100 | 100 | 100 | 27.5 |

FIG. 7D

WHITE x COATED 70D

| INPUT DENSITY [%] | | | | | FILM THICKNESS [um] |
|---|---|---|---|---|---|
| Y | M | C | K | WHITE | |
| 0 | 0 | 0 | 0 | 0 | 0 |
| 0 | 0 | 0 | 0 | 12.5 | 0.8 |
| 0 | 0 | 0 | 0 | 25 | 1.7 |
| ... | ... | ... | ... | ... | ... |
| 100 | 100 | 100 | 100 | 100 | 32 |

33 gloss

| C,M,Y,K,SPOT COLOR | R,G,B,ΔR,ΔG,ΔB |
|---|---|
| 0,0,0,0,0 | ... |
| 0,0,0,0,20 | ... |
| 0,0,0,0,60 | ... |
| 0,0,0,0,80 | ... |
| 0,0,0,0,100 | ... |
| ... | ... |
| ... | ... |
| 0,20,0,0,80 | 185,151,95 69,88,88 |
| ... | ... |
| ... | ... |

IMAGE PROCESSING SYSTEM, NON-TRANSITORY COMPUTER READABLE MEDIUM STORING PROGRAM, AND IMAGE PROCESSING METHOD FOR GENERATING STEREOSCOPIC IMAGE DATA

CROSS-REFERENCE TO RELATED APPLICATIONS

This application is based on and claims priority under 35 USC 119 from Japanese Patent Application No. 2023-048898 filed Mar. 24, 2023.

BACKGROUND

(i) Technical Field

The present invention relates to an image processing system, a non-transitory computer readable medium storing a program, and an image processing method.

(ii) Related Art

A preview technique of checking a finished state of a printed matter before printing is known.

JP4168748B discloses an image processing device that causes a display device to display a preview image imitating a print form based on image information for forming an image having a stereoscopic portion on a medium. The document describes a form in which the stereoscopic portion is represented by a specific color, blinking, or the like in the preview image.

SUMMARY

The printed matter has a swelling portion due to adhesion of an image forming material such as ink or toner. Such a swelling portion of the printed matter is requested to be expressed in the preview image of the printed matter in the same manner as or close to a real thing.

Aspects of non-limiting embodiments of the present disclosure relate to an image processing system, a non-transitory computer readable medium storing a program, and an image processing method that enable a swelling portion on a recording medium formed of an image forming material to be expressed in a preview image of a printed matter in the same manner as or close to a real thing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing system including a processor configured to generate stereoscopic image data including information representing a layer thickness of an image forming material adhered to a recording medium based on image data of a printed image, and cause a display unit to display a preview image of a printed matter based on the stereoscopic image data, in which the information representing the layer thickness of the image forming material includes information representing an aspect in which an edge of a swelling portion of the image forming material is inclined toward a recording medium surface or an aspect in which the edge of the swelling portion of the image forming material is rounded.

BRIEF DESCRIPTION OF THE DRAWINGS

Exemplary embodiment(s) of the present invention will be described in detail based on the following figures, wherein.

Figure 3:
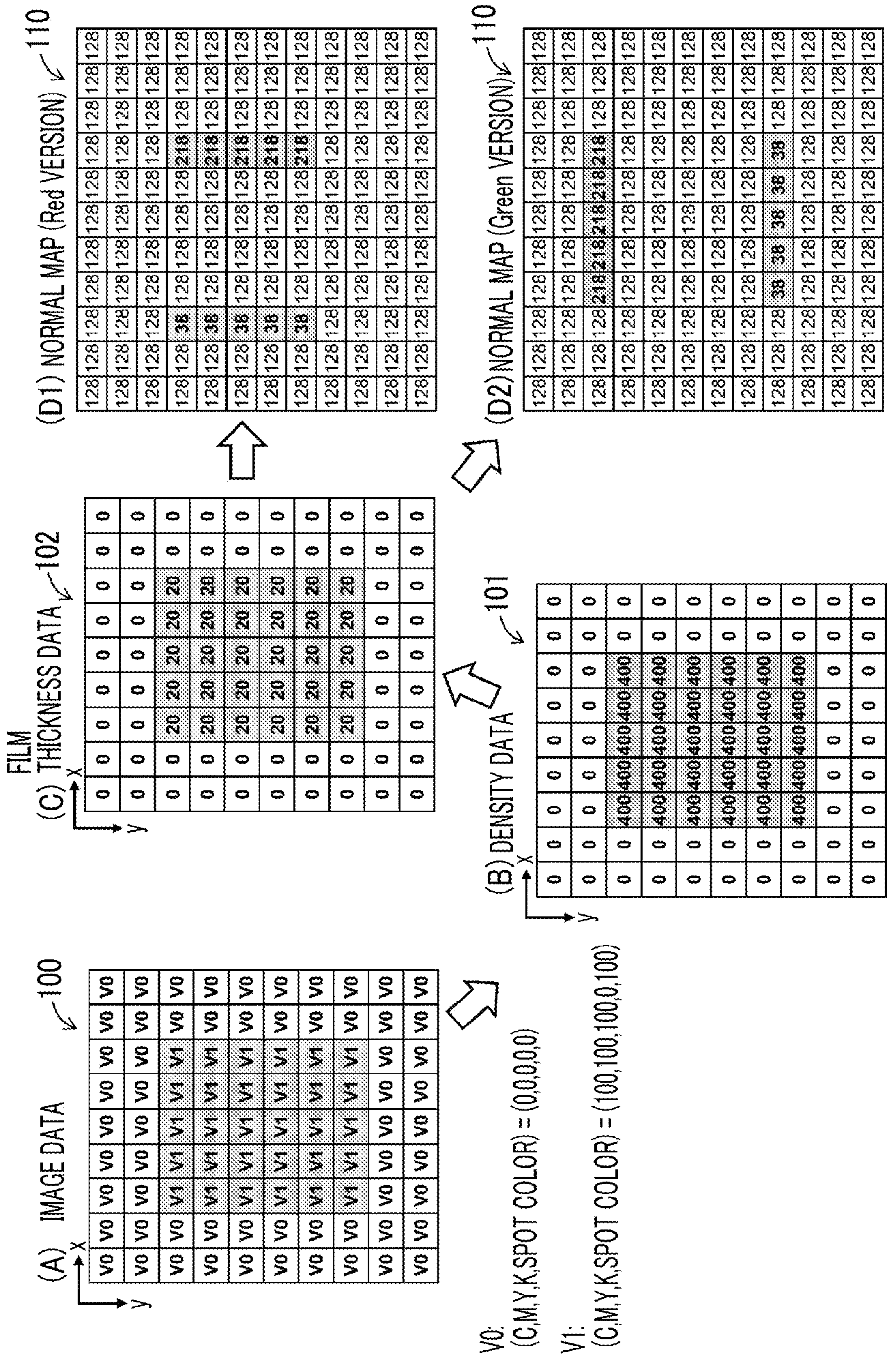
Figure 4:
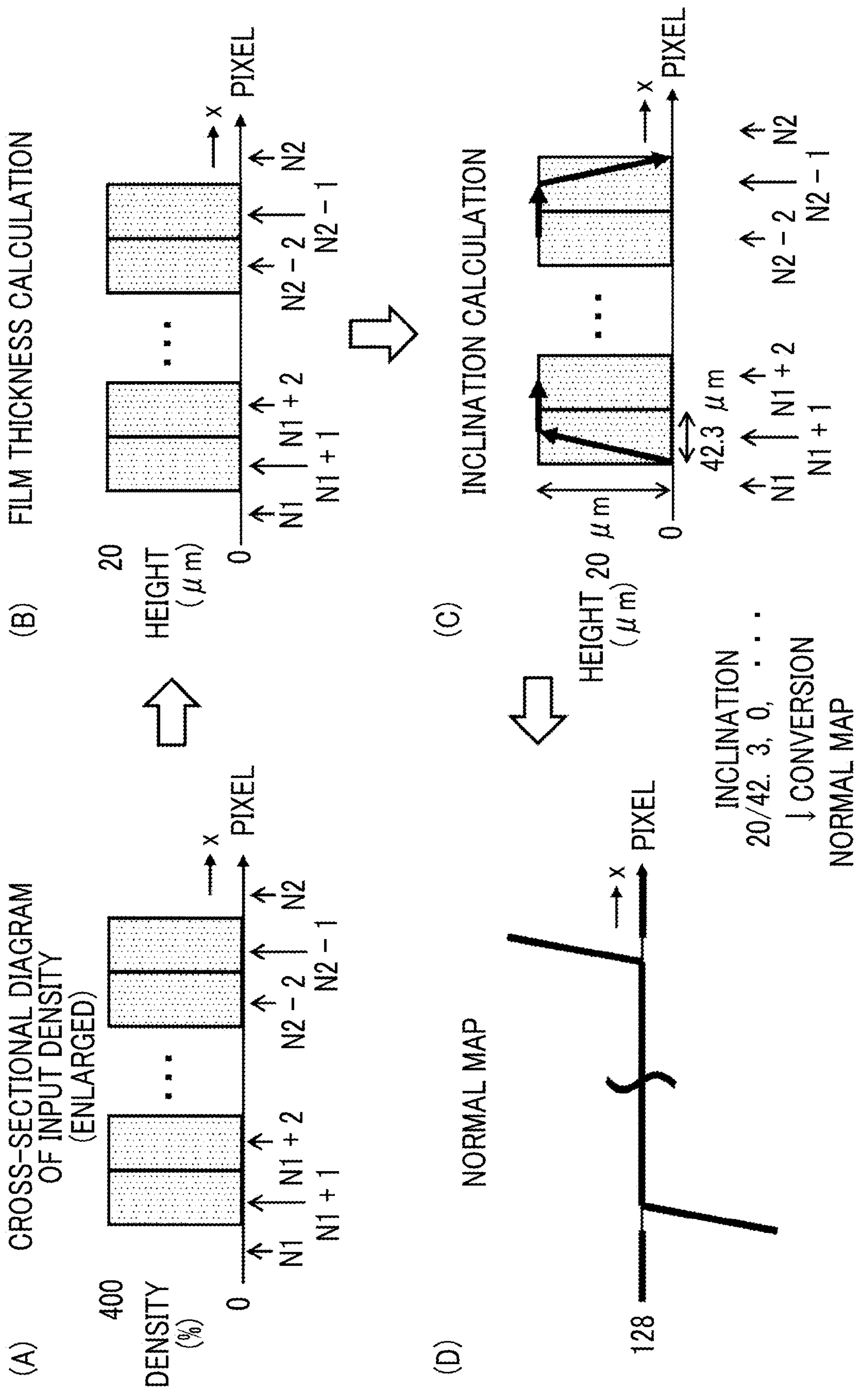
Figure 6:
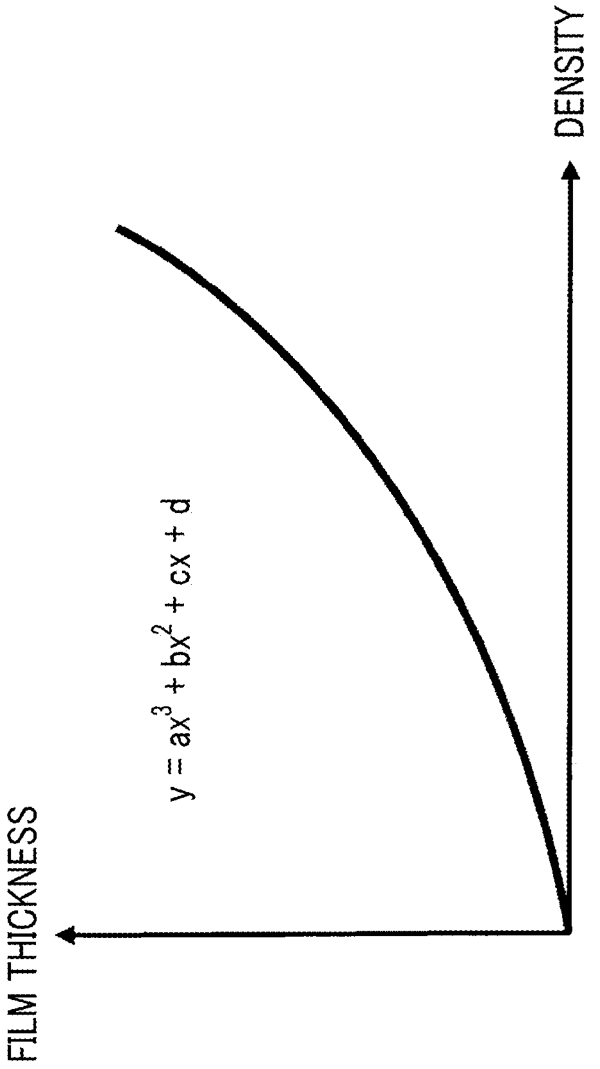
Figure 8:
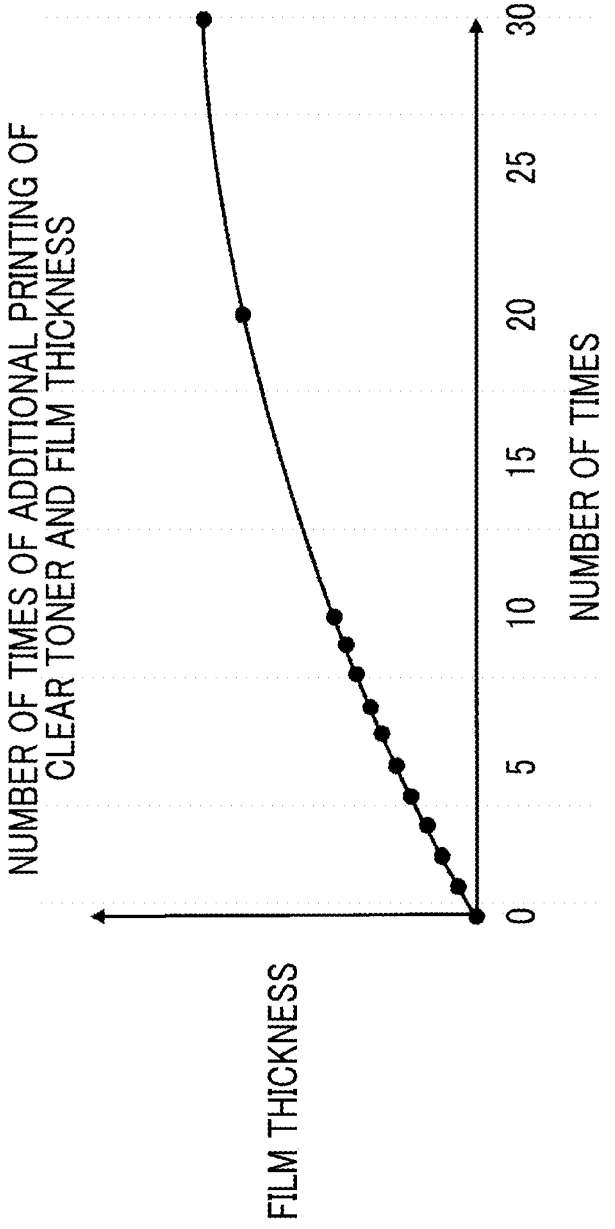
Figure 9A:
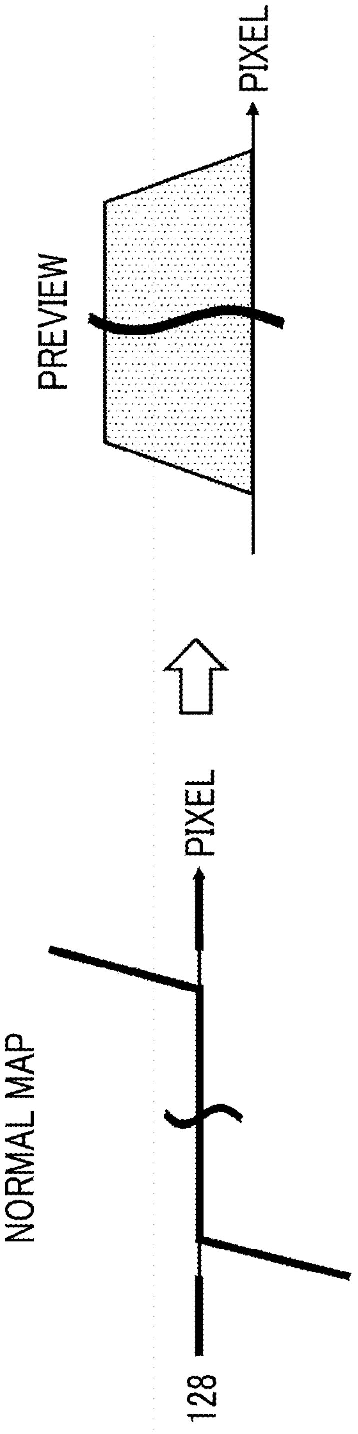
Figure 9B:
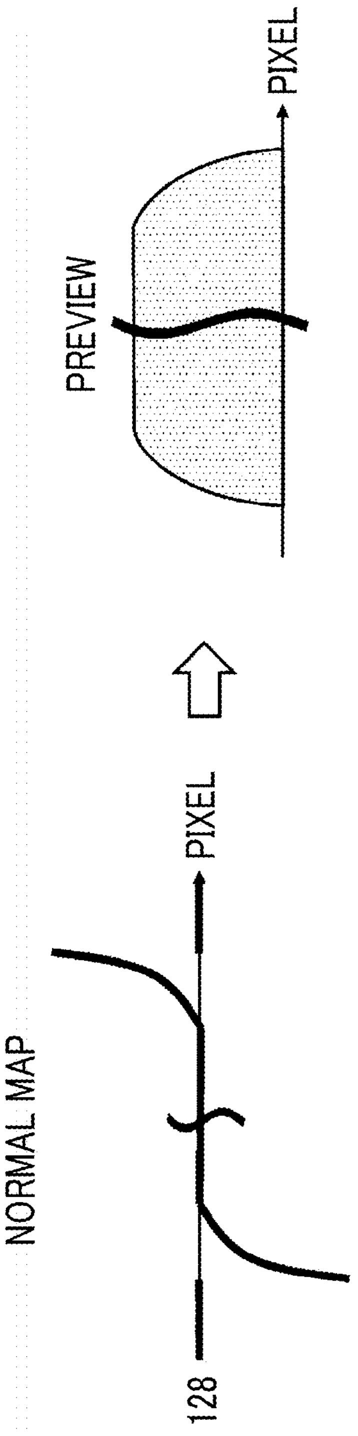
Figure 10:
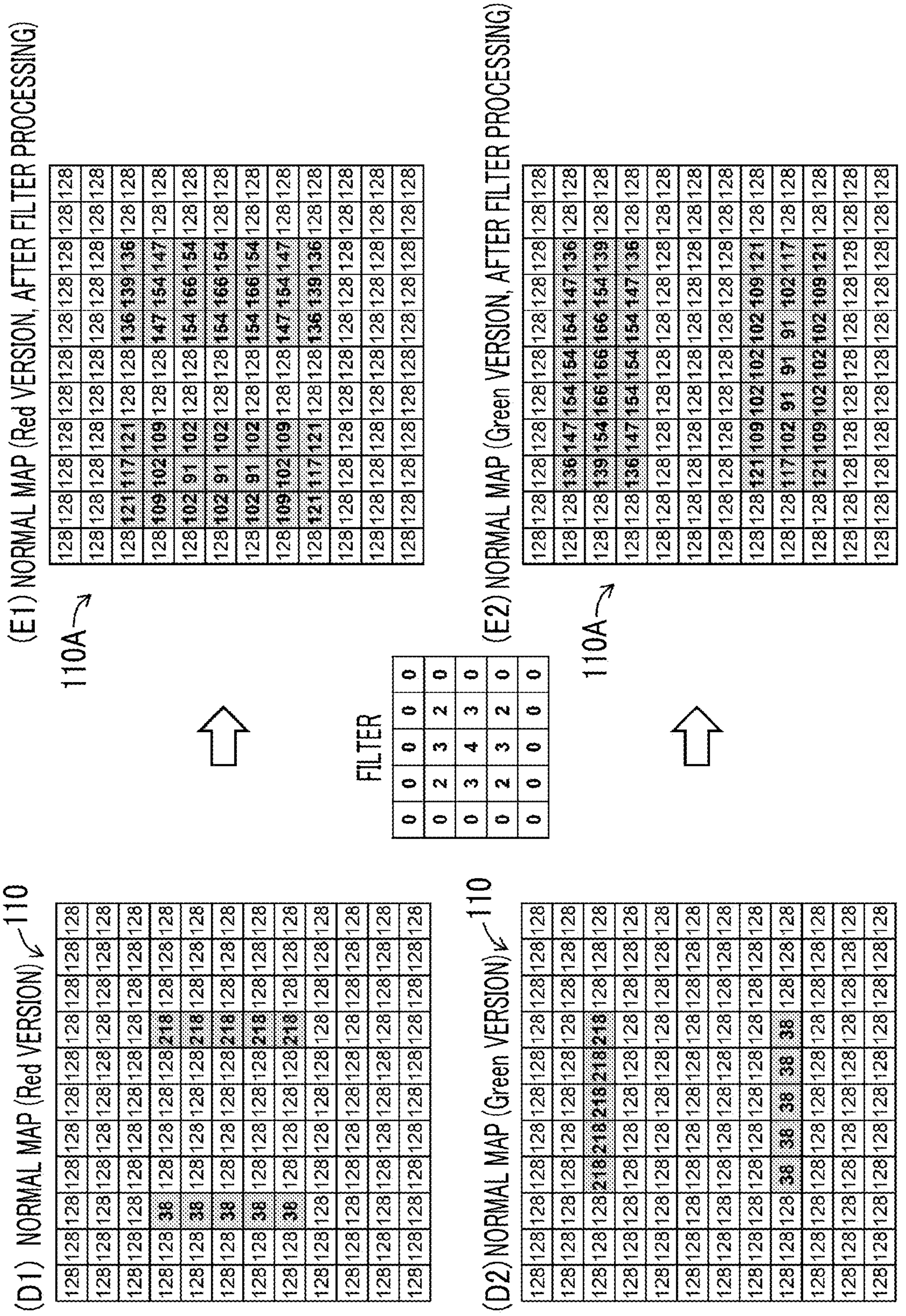
Figure 11:
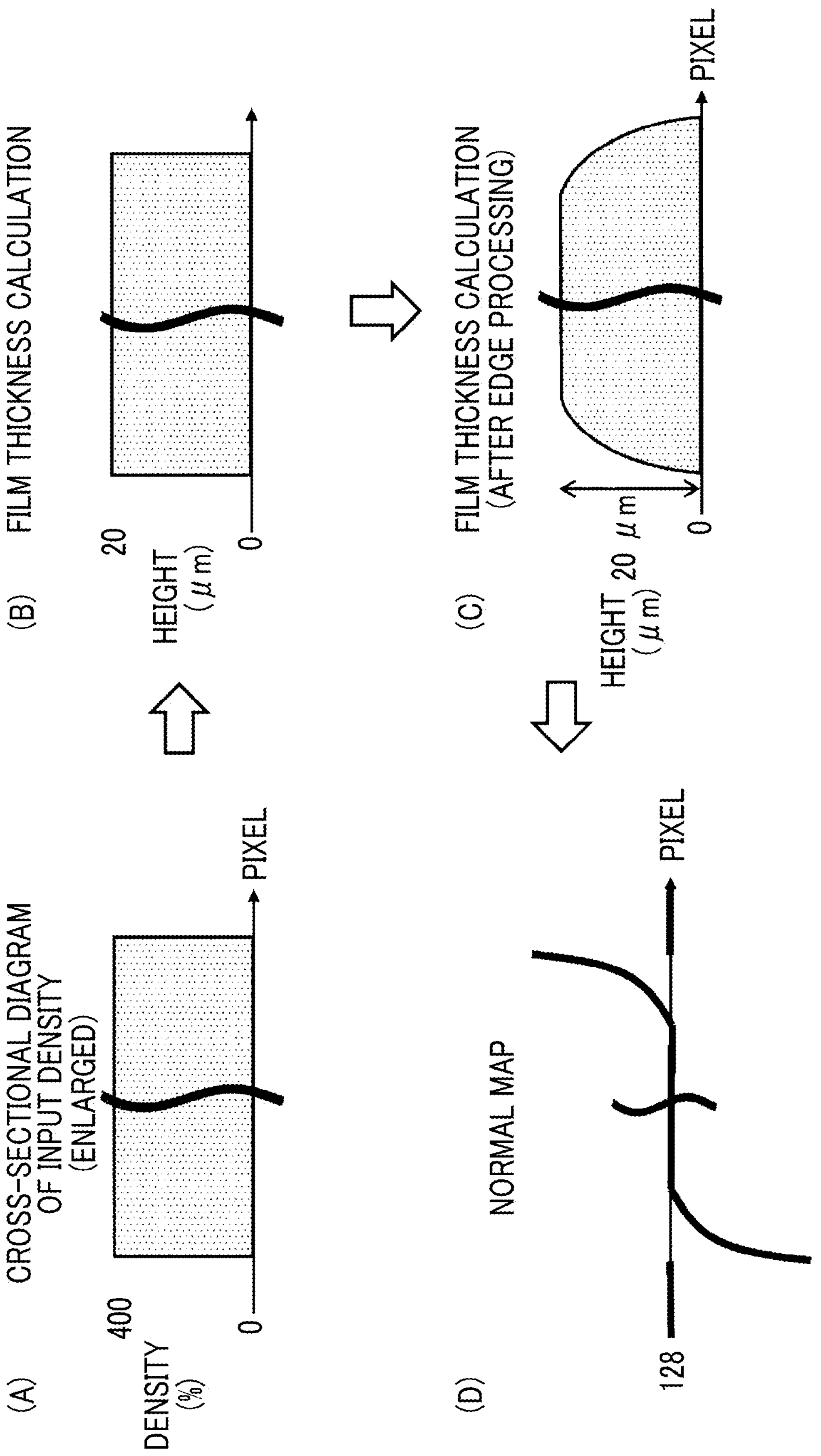
Figure 12:
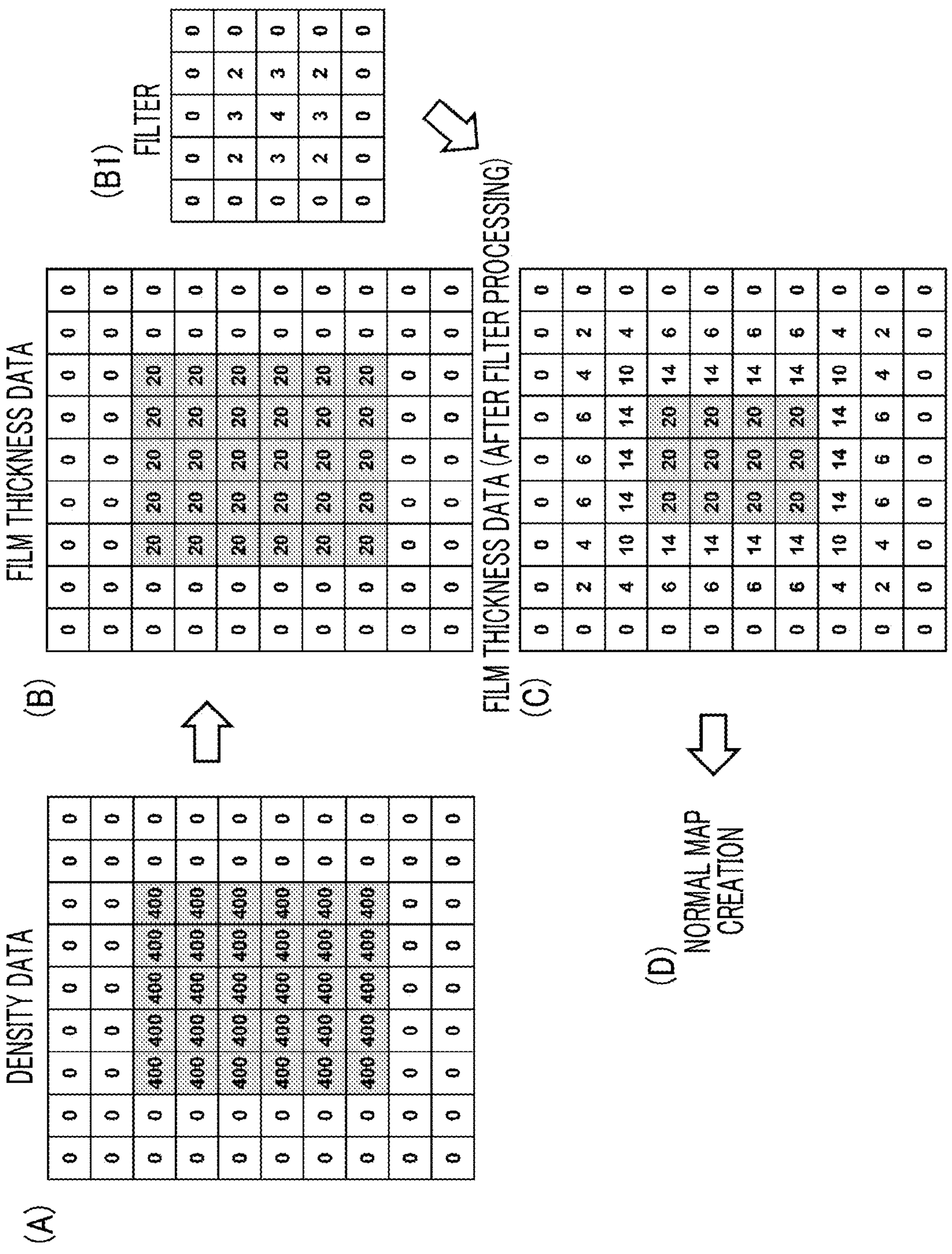
Figure 13:
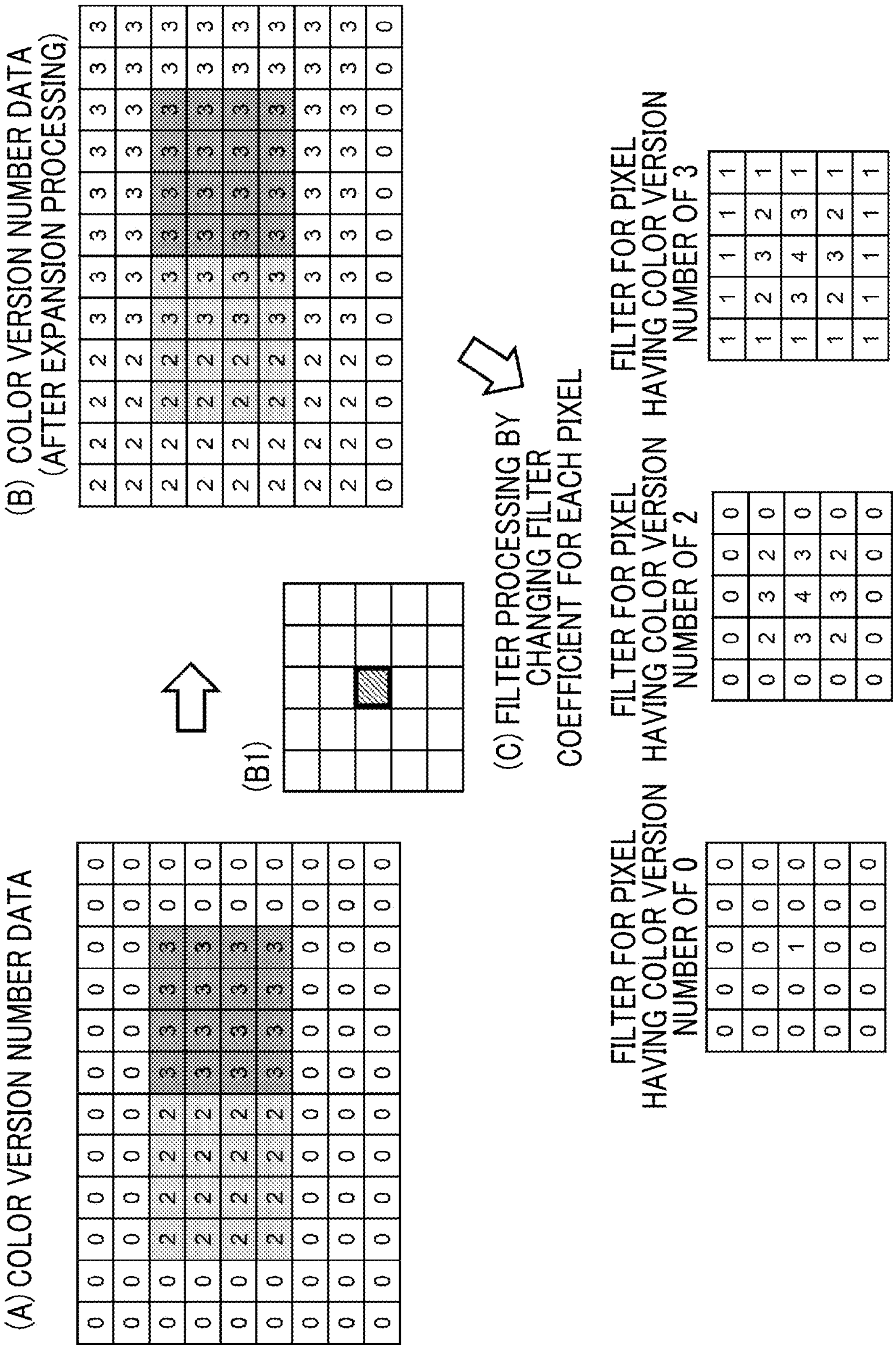
Figure 14:
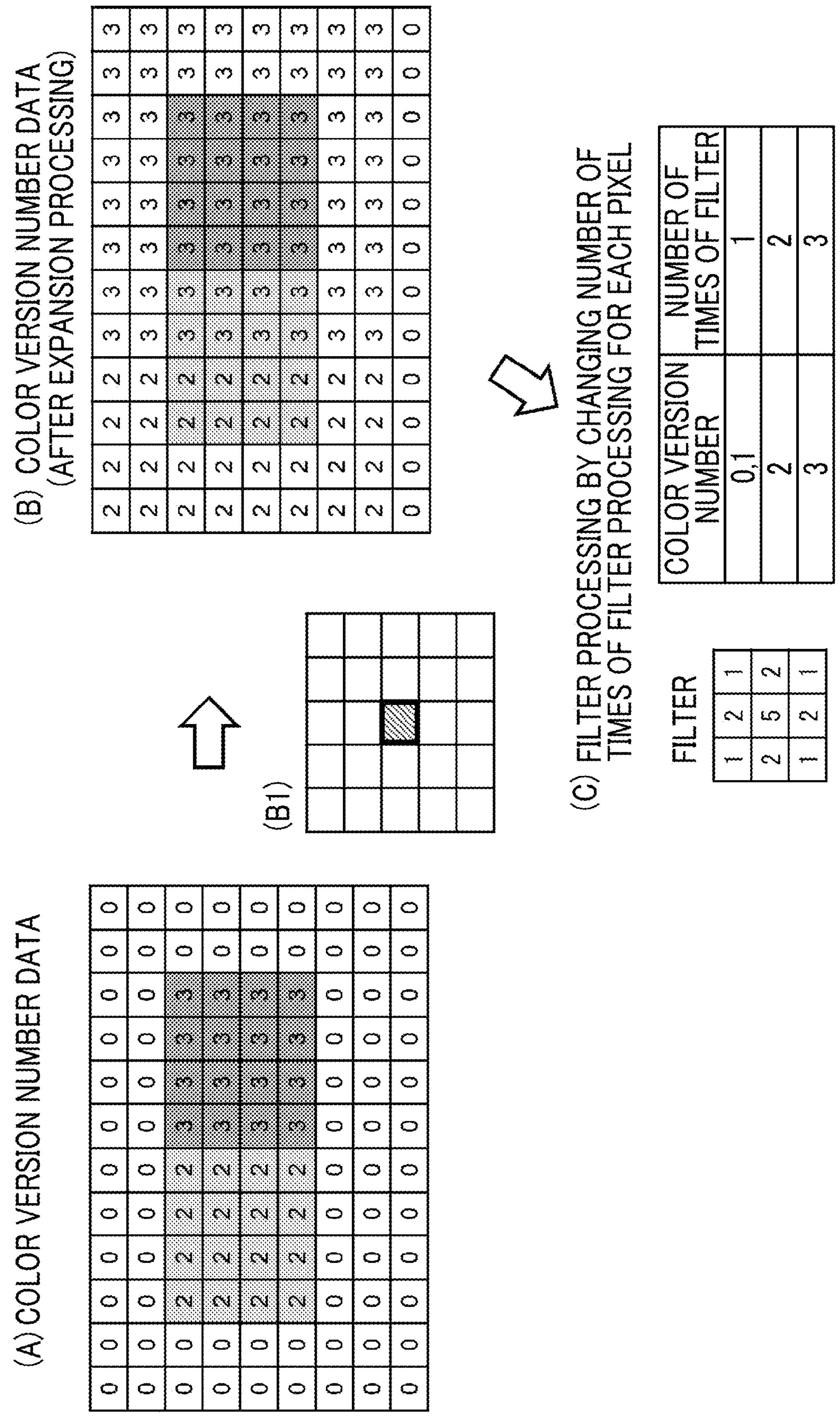
Figure 15B:
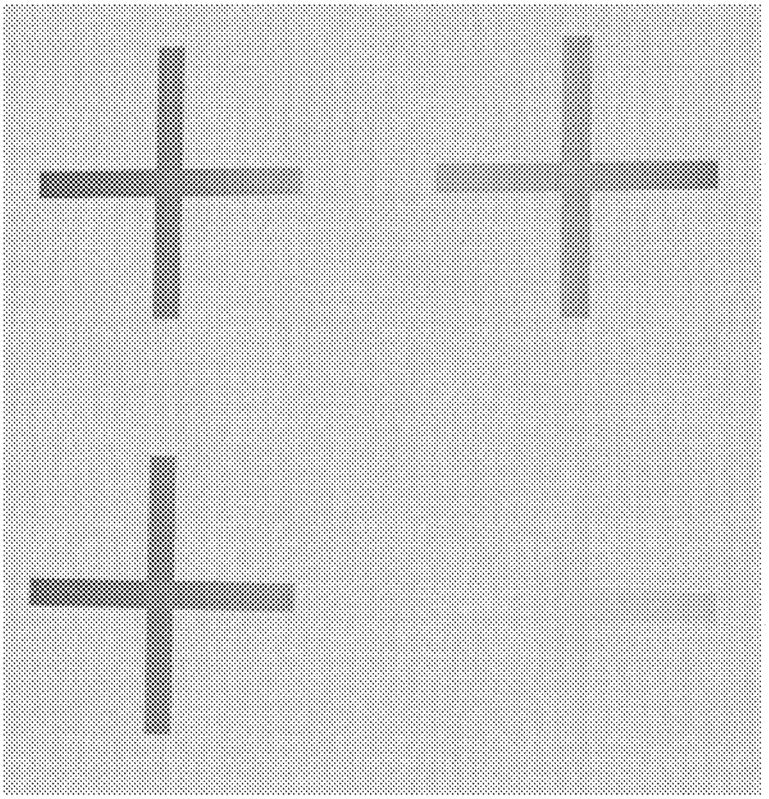
FIG. 15B RELATED ART
Figure 15A:
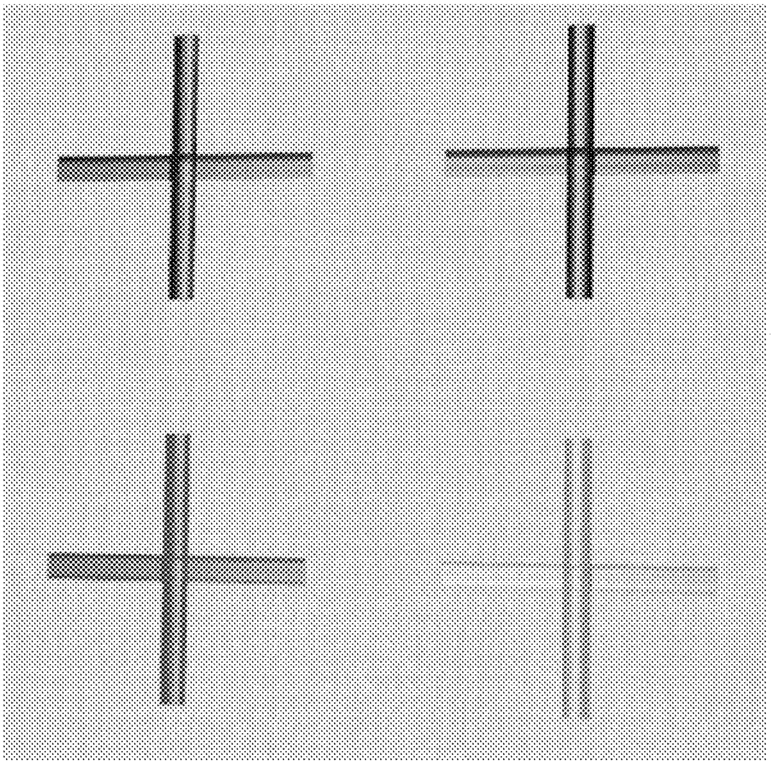
Figures 16A, 16B:
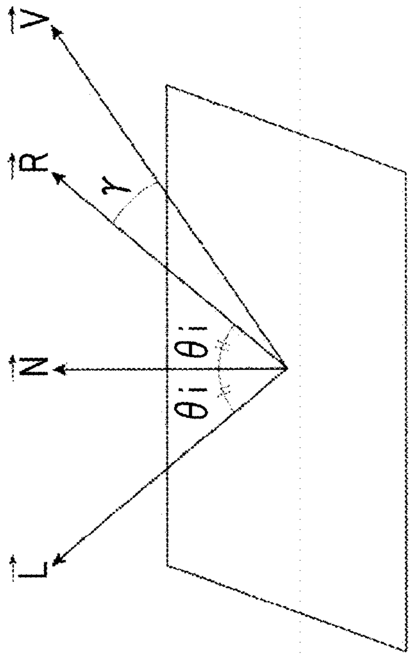
Figure 17:
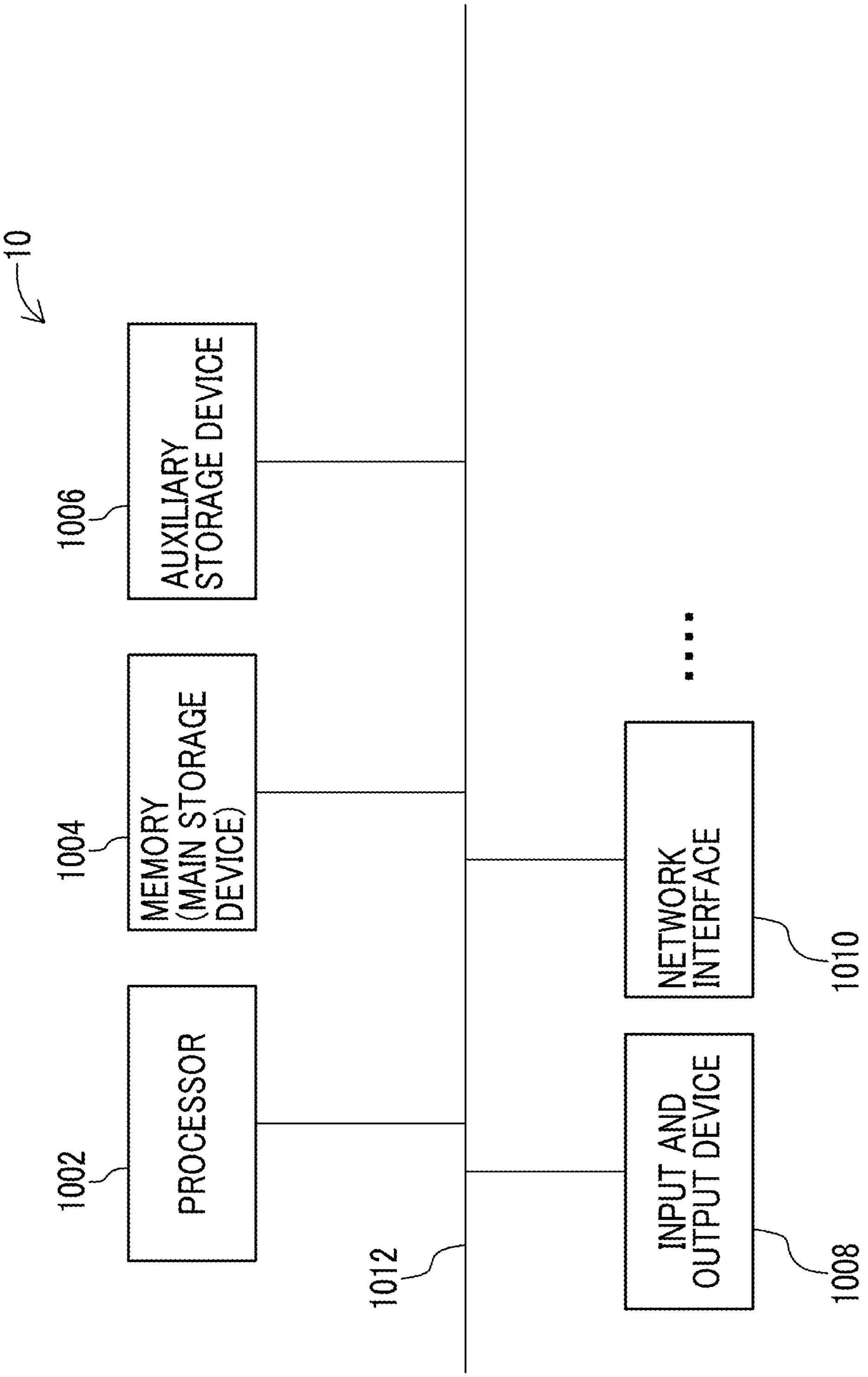

Parts (A), (B), (C), (D1), and (D2) in FIG. 3 are diagrams for describing processing of creating film thickness data and a normal map;

Parts (A), (B), (C), and (D) in FIG. 4 are diagrams for describing processing of creating film thickness data and a normal map;

FIG. 5 is a diagram showing an example of a table in which densities of a plurality of toners are associated with a film thickness;

FIG. 6 is a graph for describing an approximate expression indicating a relationship between a toner density and a film thickness;

FIGS. 7A, 7B, 7C, and 7D are diagrams showing another plurality of examples of a table in which densities of a plurality of toners are associated with a film thickness;

FIG. 8 is a graph showing a relationship between the number of times of additional printing and a film thickness;

FIGS. 9A and 9B are explanatory diagrams of smoothing processing for the normal map;

Parts (D1), (D2), (E1), and (E2) in FIG. 10 are explanatory diagrams of the smoothing processing for the normal map;

Parts (A), (B), (C), and (D) in FIG. 11 are explanatory diagrams of the smoothing processing for film thickness data;

Parts (A), (B), (B1), (C), and (D) in FIG. 12 are explanatory diagrams of the smoothing processing for film thickness data;

Parts (A), (B), (B1), and (C) in FIG. 13 are explanatory diagrams of the smoothing processing for film thickness data;

Parts (A), (B), (B1), and (C) in FIG. 14 are explanatory diagrams of the smoothing processing for film thickness data;

FIG. 15A is an example of a preview image according to an exemplary embodiment, and FIG. 15B is an example of a preview image in the related art;

FIG. 16A is an example of a color conversion table, and FIG. 16B is a diagram for describing a relationship between an incident angle and an angle $\gamma$ formed by a mirror-surface reflection direction and a line-of-sight direction; and FIG. 17 is a diagram showing an example of a hardware configuration of a computer.

DETAILED DESCRIPTION

Outline

Hereinafter, exemplary embodiments will be described in detail with reference to accompanying drawings. Configurations described below are examples for description and can be changed as appropriate. Further, in a case where a plurality of exemplary embodiments, modification examples, or the like are included in the following, characteristic portions thereof are assumed from the beginning to be combined as appropriate and used. Identical elements are designated by identical reference numerals in all drawings, and duplicate description is omitted.

Hereinafter, an exemplary embodiment of an image processing system that generates a preview image based on image data of a printed image will be described.

A printed image is an image printed on a recording medium. The image data is data representing a printed image input to the image processing system or generated in the image processing system. The image data may be, for example, data in which each pixel of the image data is represented by a pixel value of RGB or CMYK, and the pixel value may be a density value of CMYK. Further, the pixel value of the image data may include the pixel value of a spot color other than CMYK.

An image forming material is a material such as a coloring material that is adhered to the recording medium for representing the printed image. The image forming material is, for example, a toner or an ink. A color of the image forming material includes, for example, cyan (C), magenta (M), yellow (Y), and black (K) as basic colors. The color of the image forming material includes silver, gold, clear, and white as spot colors. There is no limitation on the type and color of the image forming material used for a printed matter. In the present exemplary embodiment, a toner for the basic color is referred to as "basic toner", and a toner for the spot color is referred to as "special toner".

In the following description, information representing a layer thickness of the image forming material represents a thickness of the image forming material in the printed matter. The information representing the layer thickness of the image forming material may be, for example, a normal map or a height map. In the following description, the information representing the layer thickness of the image forming material is also referred to as layer thickness information. Further, stereoscopic image data is necessary for representing the printed matter in three dimensions in the preview of the printed matter.

A printing condition is information indicating a material used for creating the printed matter and conditions (for example, environment, creating method, and equipment used) in a process of creating the printed matter. As an example, the printing conditions may be at least one of a type of recording medium used for the printed matter, a type or color of the image forming material used for printing, the number of times of additional printing, or a printing method.

Examples of the type of recording medium include plain paper, coated paper, uncoated paper, recycled paper, and a film. Examples of a type of printing method include offset printing, gravure printing, an electrophotographic method, and an inkjet method. There is no limitation on the types of recording medium and printing method.

The display unit is, for example, a display as a display device. The display unit may be, for example, a liquid crystal display and an organic electro luminescence (EL) display.

Image Processing System

Figure 1:
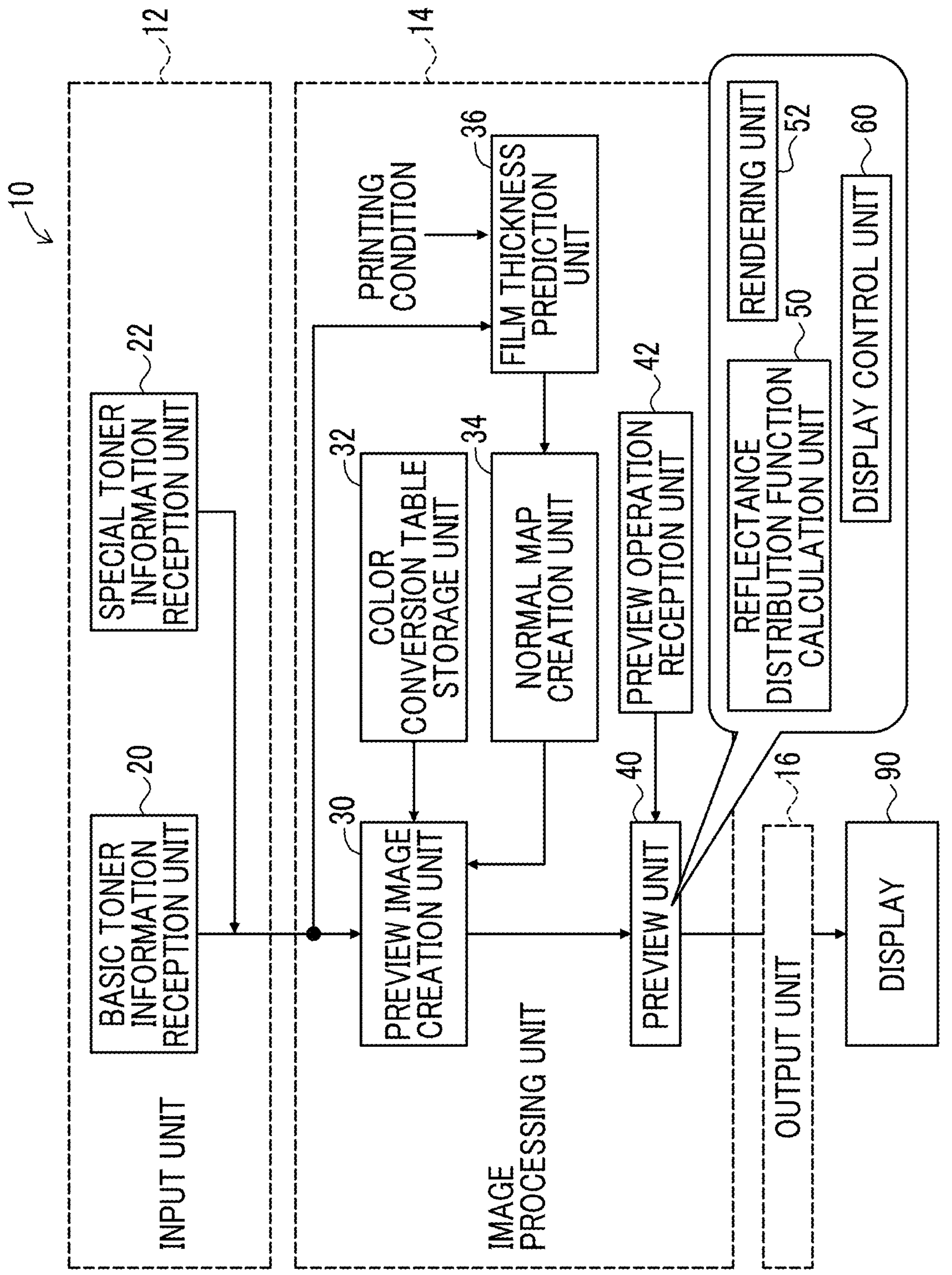
FIG. 1 is a functional block diagram of an image processing system according to an exemplary embodiment.

FIG. 1 is a functional block diagram of an image processing system 10 according to an exemplary embodiment. The image processing system 10 causes a display 90 to display the preview image for checking a finished state of the printed matter before the creation of the printed matter. The display 90 as the display unit is electrically connected to the image processing system 10. The printed matter assumed in the exemplary embodiment is created by using a toner by an electrophotographic printing device.

FIG. 15A is an example of the preview image of the present exemplary embodiment, and FIG. 15B is an example of the preview image in the related art. In the related art, printing (referred to as thick printing) in which a swelling of a toner is formed on a recording medium by using, for example, a clear toner has been known. An actual printed matter subjected to the thick printing has, for example, both glossy feeling and stereoscopic feeling. However, in the preview image in the related art, an image has the glossy feeling but no stereoscopic feeling (a state in which paper surface is shining), as shown in FIG. 15B. In the exemplary embodiment, as shown in FIG. 15A, the preview image having the stereoscopic feeling is realized as compared with the preview image in the related art.

As shown in FIG. 1, the image processing system 10 includes an input unit 12, an image processing unit 14, and an output unit 16 as functional elements.

The input unit 12 includes a basic toner information reception unit 20 and a special toner information reception unit 22. The reception units 20 and 22 receive the image data. Specifically, the basic toner information reception unit 20 receives the pixel value of four colors (CMYK) in each pixel of the image data. Further, the special toner information reception unit 22 receives the pixel value of the spot color in each pixel of the image data. In the exemplary embodiment, the spot color is one color, but there may be two or more spot colors. The pixel value of each pixel of the image data is, for example, a value of 0 to 255. Further, the pixel value of each pixel of the image data may be the density value of the toner (0 to 100%). The image processing unit 14 includes a preview image creation unit 30, a color conversion table storage unit 32, a normal map creation unit 34, a film thickness prediction unit 36, a preview unit 40, and a preview operation reception unit 42.

A plurality of color conversion tables are stored in the color conversion table storage unit 32. FIG. 16A shows an example of a color conversion table 33. In the color conversion table 33, the pixel value of the CMYK and spot color is associated with an RGB gloss value. The color conversion table 33 is prepared for each printing condition such as the recording medium and the type of toner. The preview image creation unit 30 converts the pixel value (CMYK and spot color) of the image data to the RGB gloss value for each pixel of the image data, using a color conversion table in the color conversion table storage unit 32 that corresponds to the printing condition of the printed matter, to create RGB gloss data.

The film thickness prediction unit 36 predicts a film thickness of the toner, from the pixel value (CMYK and spot color) of the image data for each pixel of the image data, to create film thickness data. The normal map creation unit 34 creates the normal map based on the film thickness data created by the film thickness prediction unit 36. The normal map is an example of the information (layer thickness information) representing the layer thickness of the image forming material. The preview image creation unit 30 outputs, to the preview unit 40, information combining the RGB gloss data obtained from the color conversion table with the normal map obtained from the normal map creation unit 34, as the stereoscopic image data.

The preview unit 40 includes a reflectance distribution function calculation unit 50, a rendering unit 52, and a display control unit 60.

The reflectance distribution function calculation unit 50 calculates a reflectance distribution function for each pixel based on the RGB gloss data obtained from the preview image creation unit 30. The rendering unit 52 disposes a three-dimensional model of the printed matter corresponding to the image data on a virtual screen in a virtual three-dimensional space and determines the RGB value of each pixel configuring a surface of the three-dimensional model. Specifically, the rendering unit 52 determines the RGB value of each pixel configuring the surface of the three-dimensional model of the printed matter based on the reflectance distribution function calculated by the reflectance distribution function calculation unit 50 and the normal map obtained from the normal map creation unit 34.

The display control unit 60 causes the display 90 to display a three-dimensional computer graphic (CG) image including the three-dimensional model of the printed matter, which is obtained from the rendering unit 52, via the output unit 16 as the preview image. The preview operation reception unit 42 receives, from a user, an operation (for example, operation of inclining printed matter) on the three-dimensional model of the printed matter in the virtual three-dimensional space. The display control unit 60 causes the display 90 to display the three-dimensional CG image that reflects the user operation received by the preview operation reception unit 42.

Figure 2:
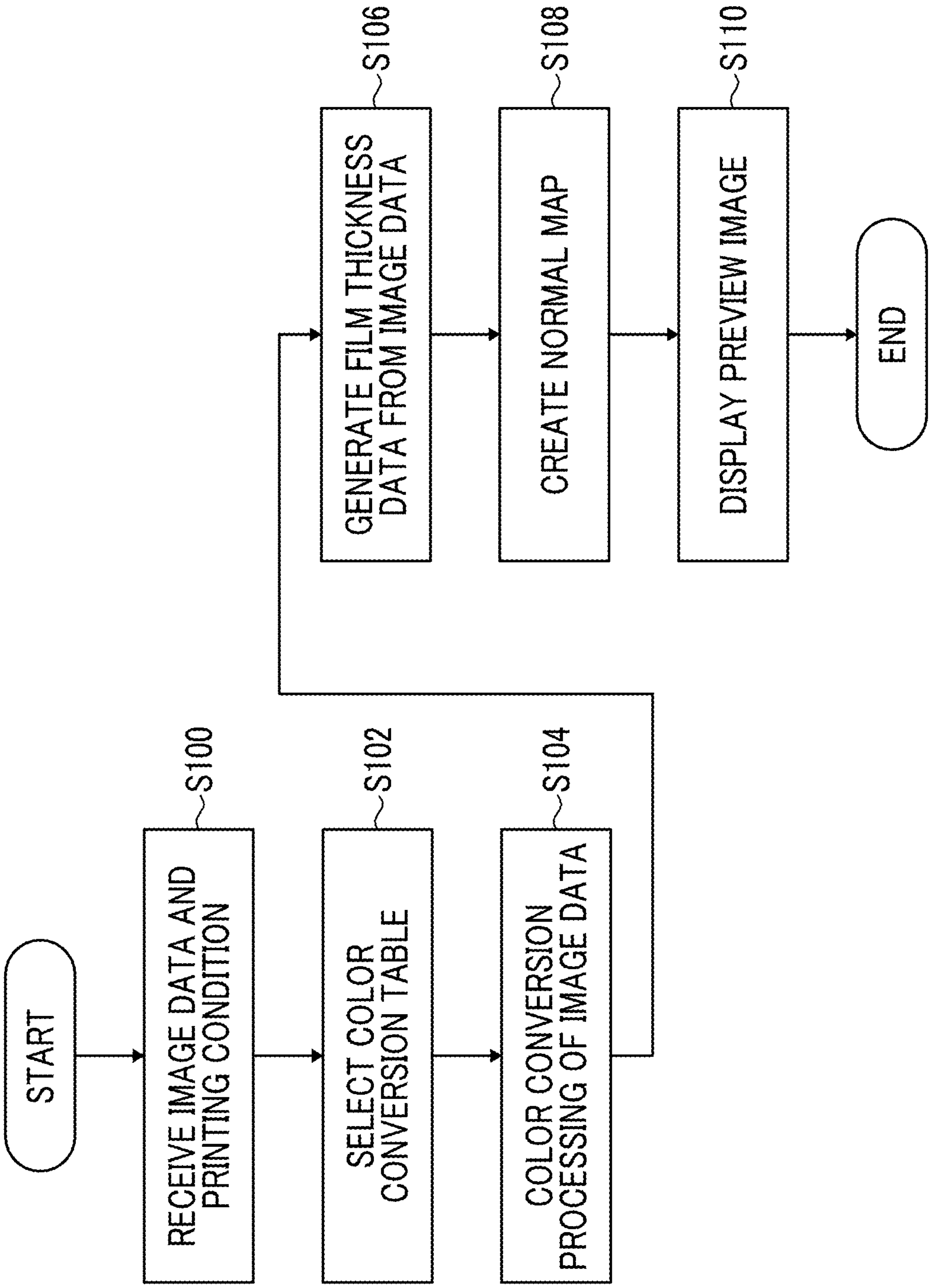
FIG. 2 is a flowchart showing processing performed by the image processing system.

FIG. 2 is a flowchart showing processing performed by the image processing system. In S100, the image processing system receives the image data of the printed matter and the printing condition. In S102, the image processing system selects the color conversion table based on the printing condition received in S100. In S104, the image processing system converts the image data (pixel value of the CMYK and spot color) to the RGB gloss data by using the color conversion table selected in S102. In S106, the image processing system generates the film thickness data based on the image data (pixel value of the CMYK and spot color). In S108, the image processing system creates the normal map based on the film thickness data generated in S106. In S110, the image processing system displays the preview image of the printed matter based on the RGB gloss data (acquired in S104) and the normal map (acquired in S108).

Film Thickness Prediction Unit and Normal Map Creation Unit

Next, specific processing by the film thickness prediction unit 36 and the normal map creation unit 34 will be described. The part (A) in FIG. 3 shows an example of image data 100. In the image data 100 of the figure, each pixel value is represented by the density value (0 to 100%) of each of the CMYK and spot color. The figure represents the image data 100 relating to the printed image in which a rectangular swelling of toner is formed in a center of an image. In the figure, each pixel V1 of a pixel group located at the center has the pixel value of (CMYK and spot color)=(100,100, 100,0,100), and each pixel V0 of the pixel group located at the periphery has the pixel value of (CMYK and spot color)=(0,0,0,0,0).

The film thickness prediction unit 36 creates density data 101 from the image data 100. The part (B) in FIG. 3 shows an example of the density data 101. The density data 101 is obtained by using, for each pixel, a total value of the density values of the CMYK and spot color (hereinafter, referred to as total density value) as the pixel value. In the part (B) in FIG. 3, the pixel value of each pixel of the pixel group located at the center is 400, and the pixel value of each pixel of the pixel group located at the periphery is 0.

Next, the film thickness prediction unit 36 creates film thickness data 102 from the density data 101. The part (C) of FIG. 3 shows an example of the film thickness data 102. The film thickness data 102 is obtained by using, for each pixel, the film thickness (unit is μm as an example) as the pixel value. The film thickness prediction unit 36 acquires, for each pixel of the density data 101, the film thickness of the film thickness data 102 from the pixel value (total density value) of the density data 101. For example, a table in which the total density value is associated with the film thickness is stored in a storage device in advance. Further, for example, a calculation equation for calculating the film thickness from the total density value is defined in advance and stored in the storage device. The film thickness prediction unit 36 acquires the film thickness from the total density value by using the table or the calculation equation. In the part (C) in FIG. 3, the pixel value (film thickness) of each pixel of the pixel group located at the center is 20 μm, and the pixel value (film thickness) of each pixel of the pixel group located at the periphery is 0 μm.

The normal map creation unit 34 creates a normal map 110 from the film thickness data 102. The normal map 110 includes data of a Red version, a Green version, and a Blue version. The part (D1) of FIG. 3 shows an example of the Red version data, and the part (D2) of FIG. 3 shows an example of the Green version data. The Blue version data is omitted. Hereinafter, the Red version, the Green version, and the Blue version will be respectively referred to as an R version, a G version, and a B version. Note that the pixels of the pieces of data of the R version and the G version of the parts (D1) and (D2) in FIG. 3 do not correspond 1:1 to the pixels of the film thickness data 102 of the part (C) in FIG. 3 (that is, resolutions are different). As a matter of course, the normal map creation unit 34 may create the pieces of data of the R, G, and B versions having the same resolution as the film thickness data 102.

The normal map creation unit 34 performs processing (hereinafter, referred to as row processing) for each pixel string arranged in a y direction (up-down direction) regarding pixel strings arranged in an x direction (right-left direction) of the film thickness data 102 to create the normal maps 110 of the R and B versions. Further, the normal map creation unit 34 performs processing (hereinafter, referred to as column processing) for each pixel string arranged in the x direction (right-left direction) regarding pixel strings arranged in the y direction (up-down direction) of the film thickness data 102 to create the normal maps 110 of the G and B versions.

The two normal maps 110 of the B version are acquired by the row processing and the column processing. Regarding the normal map 110 of the B version, the normal map creation unit 34 synthesizes the normal maps (two-dimensional data) respectively acquired in the row processing and the column processing to create one normal map (two-dimensional data). The details will be described below.

A method of creating the normal map will be specifically described. Parts (A) to (C) in FIG. 4 are diagrams schematically showing a cross section of the toner in the x direction. The method of creating the normal map by the row processing will be described with reference to the figures. The method of creating the normal map by the column processing is the same as the method of creating the normal map by the row processing except that processing for the pixels arranged in the x direction described here is only replaced with processing for the pixels arranged in the y direction.

The part (A) in FIG. 4 shows one pixel string in the density data 101 of the part (B) in FIG. 3, and the part (B) in FIG. 4 shows one pixel string in the film thickness data 102 of the part (C) in FIG. 3. In the film thickness data of the part (B) in FIG. 4, the normal map creation unit 34 calculates an inclination angle of a toner layer of a pixel of interest while moving the pixel of interest in order from left to right to acquire angle data (the part (C) in FIG. 4) in which each pixel value represents the inclination angle.

Specifically, the normal map creation unit 34 calculates the inclination angle of the toner layer from a film thickness difference between the pixel of interest and a pixel next to the right side of the pixel of interest and a width of one pixel. For example, in a case where the resolution of the image data is 600 dpi, the width of one pixel is about 42.3 μm. Assuming that the pixel of interest is a pixel N1, the film thickness difference between the film thickness of 0 μm of the pixel N1 and the film thickness of 20 μm of a pixel N+1 next to the right side of the pixel of interest is 20 μm (=−20 μm). In this case, the inclination angle of the pixel of interest N1 is calculated as arctan (−20/42.3)=−25.3 degrees. The calculated inclination angle is 25.3 degrees to the left.

Next, with movement of the pixel of interest to the right by one pixel, the pixel of interest is a pixel N1+1. The film thickness difference between the film thickness of 20 μm of the pixel of interest N1+1 and the film thickness of 20 μm of a pixel N1+2 next to the right side of the pixel of interest is 0 μm. In this case, the inclination angle of the pixel of interest N1+1 is calculated as arctan (0/42.3)=0 degree.

In the same manner, the pixel of interest is moved to the right in order, and the inclination angle of each pixel is calculated. Assuming that the pixel of interest is a pixel N2-1 now, the film thickness difference between the film thickness of 20 μm of the pixel N2-1 and the film thickness of 0 μm of a pixel N2 next to the right side of the pixel of interest is 20 μm (=+20 μm). In this case, the inclination angle of the pixel of interest N2-1 is calculated as arctan (20/42.3)=+25.3 degrees. The calculated inclination angle is 25.3 degrees to the right.

In this manner, the angle data of one pixel string is calculated. The normal map creation unit 34 converts each pixel value (inclination angle) of the angle data into the normal map. The part (D) in FIG. 4 shows the normal map of the R version of one pixel string. With the row processing described above for each pixel string arranged in the y direction, the normal map as the two-dimensional data can be obtained. That is, the normal maps of the R and B versions can be obtained.

In the column processing, the inclination angle of the pixel of interest is calculated based on the film thickness of the pixel of interest and the film thickness of a pixel next to the lower side of the pixel of interest, while moving the pixel of interest in order from top to bottom. With the calculation, the angle data is acquired. In this case, the inclination angle represents an upward or downward angle. With the column processing, the normal maps of the G and B versions can be obtained.

Normal Map

Here, the normal map will be specifically described. The normal map is information indicating a direction of a surface of an object. The normal map is RGB data corresponding to X, Y, and Z components of a normal vector of the object.

The X component of the normal vector is a component in the right-left direction and takes a range of −1 (−90 degrees: 90 degrees to the left) to 1 (90 degrees: 90 degrees to the right). These values are represented by 0 (−90 degrees: 90 degrees to the left) to 255 (90 degrees: 90 degrees to the right) as the pixel value of the R version. A relationship between a value Xv of the X component and a pixel value R of the R version is represented by, for example, the following Equation (1).

$$R = (Xv + 1)/2 \times 255 \tag{1}$$

The Y component of the normal vector is a component in the up-down direction and takes a range of −1 (−90 degrees: downward 90 degrees) to 1 (90 degrees: upward 90 degrees). These values are represented by a value of 0 (−90 degrees: downward 90 degrees) to 255 (90 degrees: upward 90 degrees) as the pixel value of the G version. A relationship between a value Yv of the Y component and a pixel value G of the G version is represented by, for example, the following Equation (2).

$$G = (Gv + 1)/2 \times 255 \tag{2}$$

The Z component of the normal vector is a front/back component and takes a range of 0 to 1. These values are represented by 0 to 255 as the pixel value of the B version. A relationship between a value Zv of the Z component and a pixel value B of the B version is represented by, for example, the following Equation (3).

$$B = Zvn \times 255 \tag{3}$$

For example, in a case where the object is a plane, the normal map (R,G,B) is (127.5,127.5,255).

For example, in a case where the object faces to the right, the normal map (R,G,B) is (255,127.5,127.5). Further, for example, in a case where the object is oriented to the right at 45 degrees, the normal map (R,G,B) is (((1+))cos(45°×127.5), 127.5,((1+))sin(45°×127.5)).

For example, in a case where the object faces upward, the normal map (R,G,B) is (127.5,255,127.5). Further, for example, in a case where the object is upward at 45 degrees, the normal map (R,G,B) is (127.5,((1+))cos(45°×127.5), ((1+))sin(45°×127.5)).

In the exemplary embodiment, the normal map (R,G,B) is calculated for each pixel in the row processing and the column processing. In the description of the exemplary embodiment, the value of the normal map may be rounded off to the nearest whole number to be represented as an integer. For example, "127.5" may be represented as "128".

In the row processing, a degree of inclination in the right-left direction of the toner layer as the object is calculated. Thus, the pixel value of the normal map of the G version (inclination in the up-down direction) is always 127.5. Therefore, in the row processing, the normal maps of the R and B versions (data) can be obtained.

In the column processing, a degree of inclination of the toner layer as the object in the up-down direction is calculated. Thus, the pixel value of the normal map of the R version (inclination in the right-left direction) is always 127.5. Therefore, in the column processing, the normal maps of the G and B versions (data) can be obtained.

Regarding the normal map of the B version, the two normal maps can be obtained by row processing and column processing. Regarding the normal map 110 of the B version, the normal map creation unit 34 synthesizes the normal maps (data) respectively acquired in the row processing and the column processing to create one normal map (data). Specifically, regarding the normal map 110 of the B version, since a pixel having a pixel value other than 255 is exclusively obtained in the row processing and the column processing, the normal map creation unit 34 creates one normal map (data) in which the pixel is set to have the pixel value other than 255 obtained by the row processing or the column processing and other pixels are set to have the pixel value of 255.

Since a size of the normal vector is always 1, in a case where the normal maps of the R and G versions are obtained, the normal map of the B version is uniquely determined. Therefore, the normal map creation unit 34 may acquire the normal map of the R version in the row processing, acquire the normal map of the G version in the column processing, and then create the normal map of the B version from the normal maps of the R and G versions.

The method of creating the normal map described above is an example. The normal map may be created by another method, and the method of creating the normal map is not limited.

Another Form of Row Processing and Column Processing

In the exemplary embodiment described above, in the row processing, the inclination angle of the pixel of interest is calculated from the film thickness of the pixel of interest and the film thickness of the pixel next to the right side of the pixel of interest. However, in the row processing, the inclination angle of the pixel of interest may be calculated based on the film thickness of the pixel of interest and the film thickness of a pixel next to the left side of the pixel of interest. Similarly, in the column processing, the inclination angle of the pixel of interest may be calculated based on the film thickness of the pixel of interest and the film thickness of a pixel next to the upper side of the pixel of interest.

In the row processing, the inclination angle of the pixel of interest may be calculated based on the film thickness of the pixel next to the left side of the pixel of interest and the film thickness of the pixel next to the right side of the pixel of interest. For example, in the part (C) in FIG. 4, assuming that the pixel of interest is the pixel N1, the inclination angle of the pixel of interest N1 is calculated based on the film thickness of 0 μm (not shown) of a pixel N1−1 next to the left side of the pixel of interest N1 and the film thickness of 20 μm of the pixel N1+1 next to the right side of the pixel of interest N1. Next, assuming that the pixel of interest is the pixel N1+1, the inclination angle of the pixel of interest N1+1 is calculated based on the film thickness of 0 μm of the pixel N1 next to the left side of the pixel of interest N1+1 and the film thickness of 20 μm of the pixel N1+2 next to the right side of the pixel of interest N1+1. In this case, a plurality of pixels have the inclination angle other than 0 degree. That is, the inclination of one toner layer is represented by the plurality of pixels.

The inclination angle of the pixel of interest may be calculated based on the film thickness of a pixel next to the left side by n (n is an integer of 1 or more) pixels from the pixel of interest and the film thickness of a pixel next to the right side by n pixels from the pixel of interest. Similarly, in the column processing, the inclination angle of the pixel of interest may be calculated based on the film thickness of a pixel next to the upper side by n pixels from the pixel of interest and the film thickness of a pixel next to the lower side by n pixels from the pixel of interest.

Another Method of Generating Film Thickness Data

Next, another method of generating the film thickness data, which is the basis of the normal map, will be described. The film thickness data 102 (for example, refer to the part (C) in FIG. 3) may be calculated directly or indirectly from each pixel value of the image data 100.

For example, as shown in FIG. 5, a table 70 in which the density value of each toner is associated with the film thickness is stored in the storage device in advance. The film thickness prediction unit 36 converts each pixel value (density value) of the image data 100 into the film thickness using the table 70 to acquire the film thickness data 102. The toner density and the film thickness may have a non-linear relationship (relationship that is not proportional). The table 70 may reflect the non-linear relationship. The table 70 of FIG. 5 is an example. In the left column of the table 70, the number of columns changes according to the type of toner used. For example, in a case where the printed matter is printed using a plurality of types of special toners, the densities of the plurality of types of special toners are defined in the left column of the table 70. For example, in a case where the printed matter is printed without using the special toner, only the toner densities of the basic color (CMYK) are defined in the left column of the table 70.

The film thickness of the toner may change according to the printing condition of the printed matter. For example, even though the density is the same, a formed film thickness may differ depending on the type of toner. Further, the formed film thickness may differ depending on the type of recording medium. Further, the formed film thickness may differ depending on the printing method or model of the printing device. Therefore, the film thickness data 102 may be created based on the printing condition. That is, the printing condition may be reflected in the film thickness, and a difference in the stereoscopic feeling of the film thickness in the preview may be expressed according to the printing condition.

In order to realize the above, the table 70 in which the density value of each toner is associated with the film thickness may be provided according to at least one of each toner type, each combination of toner types, each type of recording medium, or each printing method or model of the printing device.

FIGS. 7A, 7B, 7C, and 7D show examples of other tables 70A to 70D. The table 70A is for the printed matter in which the clear toner is used as the special toner and the uncoated paper is used as the recording medium. The table 70B is for the printed matter in which a white toner is used as the special toner and the uncoated paper is used as the recording medium. The table 70C is for the printed matter in which the clear toner is used as the special toner and the coated paper is used as the recording medium. The table 70D is for the printed matter in which the white toner is used as the special toner and the coated paper is used as the recording medium.

The thickness (film thickness) of the toner layer formed on the recording medium may differ depending on the type of the special toner. For example, the clear toner and the white toner may have different film thicknesses. The tables 70A to 70D of FIG. 4 show a tendency that the film thickness of the white toner is thicker than the film thickness of the clear toner. For example, in a case where a toner having a large grain shape is used, the thickness of the toner layer formed on the recording medium is considered to be large as compared with a case where a toner having a small grain shape is used.

Further, the thickness (film thickness) of the toner layer formed on the recording medium may differ depending on the type of the recording medium. For example, the uncoated paper has a lower smoothness than the coated paper and thus tends to have a lower film thickness. The tables 70A to 70D of FIG. 4 show a tendency that the film thickness of the uncoated paper is lower than the film thickness of the coated paper.

The film thickness prediction unit 36 selectively uses the tables 70A to 70D according to the type of toner and the recording medium used for the printed matter to create the film thickness data 102. Accordingly, the film thickness difference according to the type of toner and the recording medium may appear in the preview image.

The film thickness prediction unit 36 may convert each pixel value (density value) of the image data 100 into the film thickness by using, instead of the table 70, an approximate expression that defines a relationship between the toner density and the film thickness, as shown in FIG. 6, to create the film thickness data 102. For example, the approximate expression is prepared for each type of toner. For each pixel of the image data 100, the film thickness prediction unit 36 acquires the layer thickness of each of the plurality of toners from the density values of the plurality of toners, which are the pixel values of the image data 100, by using the approximate expression of each toner. The film thickness prediction unit 36 calculates a total layer thickness in which the layer thicknesses of the plurality of toners are totaled for each pixel to create the film thickness data 102 with the total layer thickness as the pixel value. As shown in the approximate expression of FIG. 6, the toner density and the film thickness may have a non-linear relationship (relationship that is not proportional).

Further, the approximate expression may define a relationship between a total density value of the plurality of toners and the film thickness. In this case, the film thickness prediction unit 36 calculates the total density value obtained by totaling the density values of the plurality of toners, which are pixel values of the image data 100, for each pixel of the image data 100. The film thickness prediction unit 36 converts the total density value into the film thickness by using the approximate expression for each pixel to create the film thickness data 102.

Further, the toner may be repeatedly laminated a plurality of times by additional printing or the like to form the printed matter. The additional printing is to further perform, on a surface of the recording medium printed by the printing device, the printing from above. In this case, the film thickness prediction unit 36 acquires, for each pixel of the image data 100, the film thickness (referred to as temporary film thickness) from the table 70 or the like showing the relationship between the density value of each toner and the film thickness and calculates a total film thickness by adding the film thickness for the additional printing (referred to as additional film thickness) to the temporary film thickness to create the film thickness data 102 with the total film thickness as the pixel value.

FIG. 8 is an example of a graph showing a relationship between the number of times of additional printing and the additional film thickness. The number of times of additional printing means the number of times the additional printing is performed. FIG. 8 is a graph relating to the additional printing with the clear toner. As shown in the graph of FIG. 8, the number of times of additional printing and the additional film thickness may have a non-linear relationship (relationship that is not proportional). For example, a table corresponding to the graph as shown in FIG. 8 (table that defines the relationship between the number of times of additional printing and the additional film thickness) is stored in advance in the storage device. The film thickness prediction unit 36 acquires, using the table, the additional film thickness corresponding to the number of times of additional printing in the printed matter and adds the additional film thickness to the temporary film thickness to calculate the total film thickness.

As described above, the film thickness data 102 can be generated by various methods. The method of generating the film thickness data 102 is not limited. The film thickness data 102 may be acquired by multiplying the temporary film thickness for each pixel by a coefficient set in advance according to at least one of the type of toner, the type of recording medium, the type of printing method, or the type of printing device (model or the like), which is set based on the image data 100.

In the present exemplary embodiment, in order to represent the thickness of the image forming material of the printed matter in the preview image, the normal map as the layer thickness information is used in the preview unit 40 (rendering unit 52). However, the height map may be used instead of the normal map as the layer thickness information in the preview unit 40 (rendering unit 52). The height map is, for example, the film thickness data 102 or a map obtained by multiplying each pixel value of the film thickness data 102 by a predetermined coefficient.

Processing for Swelling Portion

Next, processing for a swelling portion of the image forming material (toner as an example) will be described. In the swelling portion of the toner of the printed matter, the film thickness of an edge may be lower than the film thickness of the center due to misalignment of toners of a plurality of colors (misalignment of the versions) or the like. Accordingly, the actual printed matter may have an aspect in which the edge of the swelling portion of the toner is inclined toward a recording medium surface or an aspect in which the edge thereof is rounded. In the exemplary embodiment described here, the edge of the swelling portion on the recording medium may appear in the preview image of the printed matter in the same manner as or close to a real printed matter.

In order to realize the above, as shown in FIGS. 9A and 9B, the normal map includes information representing the aspect in which the edge of the swelling portion is inclined or the aspect in which the edge thereof is rounded. The aspect in which the edge of the swelling portion is inclined (refer to FIG. 9A) is realized by, for example, generating the angle data (refer to the part (C) in FIG. 4) from the film thickness data such that the plurality of pixels represent an inclination of one toner layer. The above Is realized by calculating the inclination angle (pixel value of angle data) of the pixel of interest based on the film thickness of a pixel next to the left side by n (n is an integer of 1 or more) pixels from the pixel of interest and the film thickness of a pixel next to the right side by n pixels from the pixel of interest in the film thickness data, as described with reference to the part (C) in FIG. 4. Since the normal map is calculated from the angle data (refer to the part (C) in FIG. 4), the normal map includes the information representing the aspect in which the edge of the swelling portion is inclined (refer to FIG. 9A).

Further, in the preview image of the printed matter, smoothing processing may be performed on the film thickness data or the normal map in order to represent the aspect in which the edge of the swelling portion is inclined or the aspect in which the edge is rounded. Processing performed on information representing the edge of the swelling portion is also referred to as contour processing or edge processing.

First, the smoothing processing for the normal map will be described. The normal maps 110 of parts (D1) and (D2) in FIG. 10 are the same as the normal maps 110 of the parts (D1) and (D2) in FIG. 3 described above. The normal map creation unit 34 performs the smoothing processing on each of the normal maps 110 of the R and G versions by using a filter (refer to FIG. 10) to create smoothed normal maps 110A of the R and G versions. The filter may be, for example, a smoothing filter.

The smoothing processing (here, filter processing) of this exemplary embodiment is performed while moving the pixel of interest left, right, up, and down. In a state where the center of the filter is disposed on the pixel of interest, the pixel value of the pixel of interest is multiplied by a coefficient of the center of the filter and each pixel around the pixel of interest is multiplied by each coefficient around the center of the filter disposed corresponding to each pixel to obtain a total value of the multiplication results, and the total value is divided by a total sum of the coefficients of the filter to obtain a pixel value of the pixel of interest after the filter processing. The form of the filter is not limited to the form described here. Further, the smoothing processing is not limited to the processing using the filter. The same applies to the smoothing processing described below.

Since a size of the normal vector is always 1, in a case where the normal maps of the R and G versions are obtained, the normal map of the B version is uniquely determined. The normal map creation unit 34 creates a smoothed normal map 110A of the B version (not shown) from the smoothed normal maps 110A of the R and G versions. Accordingly, the normal map includes the information representing the aspect in which the edge of the swelling portion is inclined (refer to FIG. 9A) or the information representing the aspect in which the edge of the swelling portion is rounded (refer to FIG. 9B).

Next, an exemplary embodiment will be described in which the information representing the aspect in which the edge of the swelling portion is inclined or rounded is created in the normal map with the smoothing processing for the film thickness data. Parts (A), (B), (C), and (D) in FIG. 11 are explanatory diagrams of this exemplary embodiment. The film thickness prediction unit 36 performs the smoothing processing on the edge of the swelling portion of the toner in the film thickness data (refer to the part (B) in FIG. 11) to generate smoothed film thickness data (refer to the part (C) in FIG. 11). Then, the normal map creation unit 34 creates a normal map (refer to the part (D) in FIG. 11) based on the smoothed film thickness data (refer to the part (C) in FIG. 11).

FIG. 12 shows an example in which the smoothing processing is performed on the film thickness data (refer to a part (B) in FIG. 12) by using the filter (refer to a part (B1) in FIG. 12) to generate the smoothed film thickness data (refer to a part (C) in FIG. 12). The usage of the filter (the part (B1) in FIG. 12) is the same as the filter for the normal map described above. In the examples shown in the parts (A), (B), (B1), (C), and (D) in FIG. 12, the smoothed film thickness data is acquired with the filter processing for the entire film thickness data. In this manner, the film thickness prediction unit 36 may perform the smoothing processing for the entire film thickness data to acquire the smoothed film thickness data. Further, the film thickness prediction unit 36 may perform the smoothing processing only on pixels representing the edge of the swelling portion in the film thickness data to acquire the smoothed film thickness data.

In this exemplary embodiment, the normal map also includes the information representing the aspect in which the edge of the swelling portion is inclined (refer to FIG. 9A) or the information representing the aspect in which the edge of the swelling portion is rounded (refer to the part (D) in FIG. 11).

As described above, the height map may be used instead of the normal map as the layer thickness information in the preview unit 40 (rendering unit 52). The height map is, for example, the film thickness data or processed data thereof. In this case, the smoothed film thickness data or the processed data thereof is used by the preview unit 40 as the height map. The film thickness data and the smoothed film thickness data are also referred to as data representing a height of the swelling portion.

Next, another method of creating the smoothed film thickness data will be described. The film thickness prediction unit 36 may execute the smoothing processing based on the height of the swelling portion of the toner in the film thickness data such that the toner is expanded around the edge of the swelling portion of the toner in the film thickness data to create the smoothed film thickness data. This exemplary embodiment will be described below.

Parts (A), (B), (B1), and (C) in FIG. 13 are diagrams for describing an exemplary embodiment in which the film thickness data is smoothed by using a plurality of types of filters. The part (A) in FIG. 13 is a diagram showing an example of color version number data. The color version number data is data in which the film thickness data and the pixels are associated with each other on a one-to-one basis and is data whose pixel value represents a color version number. The color version number is the number of types of toner used for the pixel. For example, the color version number of 2 is for a pixel in which two types of toner are used, and the color version number of 3 is for a pixel in which three types of toner are used. In the example of the part (A) in FIG. 13, the pixel having the color version number of 2 is a pixel in which two toners of cyan and clear are used at the density value of 100%, respectively, and the pixel having the color version number of 3 is a pixel in which three toners of cyan, magenta, and clear are used at the density value of 100%, respectively. The film thickness prediction unit 36 creates the color version number data and the film thickness data (not shown in the parts (A), (B), (B1), and (C) in FIG. 13) based on the image data.

Next, the film thickness prediction unit 36 performs edge expansion processing on the color version number data (the part (A) in FIG. 13) such that the toner is expanded around the edge of the swelling portion (pixels having the color version number of 2 and 3) to create expanded color version number data (the part (B) in FIG. 13). For example, the film thickness prediction unit 36 sequentially moves the pixel of interest in the color version number data (the part (A) in FIG. 13) to the left, right, up, and down to set a maximum pixel value in 5×5 pixels with the pixel of interest as the center (refer to the part (B1) in FIG. 13) as an expanded pixel value of the pixel of interest.

Next, the film thickness prediction unit 36 changes the filter applied to each pixel of the film thickness data according to each pixel value (color version number) of the expanded color version number data (the part (B) in FIG. 13) to create the smoothed film thickness data.

Specifically, the filter is prepared for each color version number as shown in the part (C) in FIG. 13. The filter is configured such that the pixel value of the pixel of interest is affected by the pixel value of a pixel farther from the pixel of interest as the value of the color version number is larger. The film thickness prediction unit 36 performs, using a filter for the pixel having the color version number of 0 (refer to the part (C) in FIG. 13), the filter processing on the pixel of the film thickness data corresponding to the pixel whose pixel value of the expanded color version number data (the part (B) in FIG. 13) is 0. Similarly, the film thickness prediction unit 36 performs, using a filter for the pixel having the color version number of 2 (refer to the part (C) in FIG. 13), the filter processing on the pixel of the film thickness data corresponding to the pixel whose pixel value of the expanded color version number data (the part (B) in FIG. 13) is 2. The same applies to the pixels having the color version number of 3, and the filter processing is performed using a filter for the pixel having the color version number of 3 (refer to the part (C) in FIG. 13). The usage of the filter is the same as the filter for the film thickness data or the normal map described above. In the example of FIG. 13, the filter processing for the pixel having the color version number of 1 is omitted. However, a filter for the pixel having the color version number of 1 may be prepared, and the filter processing may be performed on the pixel having the color version number of 1.

According to this exemplary embodiment, the smoothed film thickness data has information on a toner expansion portion in which the toner is expanded around the edge of the swelling portion of the toner, and has information that a toner height of the toner expansion portion around the edge thereof becomes higher as the edge of the swelling portion is higher.

Although the color version number has been described here, the same applies to the number of times of additional printing. That is, data of the number of times of additional printing in which the number of times of additional printing applied to each pixel is defined is prepared, instead of the color version number data, and the processing described above is performed. In addition, data in which a value obtained by combining the color version number applied to each pixel and the number of times of additional printing is defined may be prepared, and the processing described above may be performed on the data. The same applies to the following exemplary embodiment described below.

Next, an exemplary embodiment will be described in which the filter processing is performed on the film thickness data a plurality of times to create the smoothed film thickness data. Parts (A), (B), (B1), and (C) in FIG. 14 are explanatory diagrams of this exemplary embodiment. The color version number data in the parts (A) and (B) in FIG. 14 is the same as the color version number data in the parts (A) and (B) in FIG. 13. The film thickness prediction unit 36 changes the number of times of the filter processing for each pixel of the film thickness data according to each pixel value (color version number) of the expanded color version number data (refer to the part (B) in FIG. 14) to create the smoothed film thickness data.

Specifically, as shown in the part (C) in FIG. 14, the film thickness prediction unit 36 performs, using a filter (refer to the part (C) in FIG. 14), the filter processing on pixels (that is, all pixels) of the film thickness data corresponds to pixels (that is, all pixels) in which the pixel value of the expanded color version number data (the part (B) in FIG. 14) is 0 or more to acquire the smoothed film thickness data once. Next, the film thickness prediction unit 36 performs, using the filter (refer to the part (C) in FIG. 14), the filter processing on pixels of the smoothed film thickness data once corresponds to pixels in which the pixel value of the expanded color version number data (the part (B) in FIG. 14) is 2 or more to acquire the smoothed film thickness data twice. Then, the film thickness prediction unit 36 performs, using the filter (refer to the part (C) in FIG. 14), the filter processing on pixels of the smoothed film thickness data twice corresponds to pixels in which the pixel value of the expanded color version number data (the part (B) in FIG. 14) is 3 or more to acquire the smoothed film thickness data three times. The film thickness prediction unit 36 sets the smoothed film thickness data three times as the smoothed film thickness data of a final version.

Also in this exemplary embodiment, the smoothed film thickness data has information on a toner expansion portion in which the toner is expanded around the edge of the swelling portion of the toner, and has information that a toner height of the toner expansion portion around the edge thereof becomes higher as the edge of the swelling portion is higher.

The aspect of the edge of the swelling portion of the toner in the printed matter may change depending on the type of toner, the type of recording medium, and the printing method or model of the printing device. Accordingly, the film thickness data or the normal maps may be created such that the aspect of the edge of the swelling portion in the preview image is different according to at least one of the type of toner used for the printed matter, the type of recording medium, the printing method of the printing device, or the model of the printing device.

Color Conversion Table

From here, a method of realizing the preview will be described in detail. First, the color conversion table used by the preview image creation unit 30 (refer to FIG. 1) will be described in detail. FIG. 16A is a diagram showing an example of the color conversion table 33. In the color conversion table 33, the pixel value (CMYK and spot color) of the image data is associated with the RGB value and the gloss value. The gloss value is represented by three numerical values of ΔRΔGΔB.

The color conversion table 33 is prepared for each combination of, for example, the recording medium, the image forming material (toner or the like), and the printing method. Therefore, there are a plurality of color conversion tables 33.

The color conversion table 33 is created, for example, as follows. First, a patch chart is prepared in which a plurality of patches having different colors and densities are printed on the recording medium. An image reading apparatus reads the patch chart to acquire each average RGB value of a diffuse reflection image and a mirror-surface reflection image for each patch. The average RGB value of the diffuse reflection image is the RGB value of the color conversion table 33. A difference between the average RGB value of the diffuse reflection image and the average RGB value of the mirror-surface reflection image is calculated to generate a difference image. The RGB value of the difference image is a ΔRΔGΔB value of the color conversion table 33. The pixel value (CMYK and spot color) of the patch is associated with the RGB value and the ΔRΔGΔB value corresponding to the patch for each patch to generate the color conversion table 33.

Information on the recording medium, the image forming material (toner or the like), and the printing method used for the patch chart is added to the color conversion table 33, and the color conversion table 33 is managed by the color conversion table storage unit 32 (refer to FIG. 1). The details of the method of creating the color conversion table 33 described here are described in, for example, JP2020-52483A.

One color conversion table is selected from the plurality of color conversion tables 33 based on the recording medium, the image forming material (toner or the like), the printing method, and the like used for the creation of the printed matter to be previewed, and color conversion processing is performed by using the selected color conversion table 33 (S104 in FIG. 2).

In the color conversion table 33 (refer to FIG. 16A), the value of 0 to 255 or the value of 0 to 100% (density) may be specified as the pixel value of the CMYK and spot color in the left column. Further, in the color conversion table 33, a value of an L*, a*, and b* system may be specified in the right column, instead the RGB value. Further, the gloss value of one numerical value may be specified, instead of ΔRΔGΔB. The color conversion table 33 described here is an example, and the color conversion table for realizing the preview display or means instead of the color conversion table is not limited.

Preview Display

Next, processing performed by the preview image creation unit 30 (refer to FIG. 1) and the preview unit 40 will be described in detail. The preview image creation unit 30 and the preview unit 40 may be realized, for example, by employing a known technique described in JP2020-52483A. The processing up to the preview display will be described.

The preview image creation unit 30 searches the color conversion table 33 (refer to FIG. 16A) using the CMYK and spot color as a search key for each pixel of the image data and reads out the RGB value and the ΔRΔGΔB value corresponding to the CMYK and spot color.

In a case where the pixel value (CMYK and spot color) of the image data is not recorded in the color conversion table 33, the preview image creation unit 30 may read out the RGB value and the ΔRΔGΔB value corresponding to a color similar to the CMYK and spot color of the image data. Here, the similar color refers to, for example, a color having a closest distance in a color space and a color within a distance set in advance. Further, the preview image creation unit 30 may read out a plurality of sets of RGB values and ΔRΔGΔB values for a plurality of similar colors and calculate estimated values of the RGB values and ΔRΔGΔB values from these values.

Accordingly, the RGB gloss data as the two-dimensional data in which each pixel value consists of the RGB value and the ΔRΔGΔB value (RGB gloss value) can be obtained.

The reflectance distribution function calculation unit 50 calculates the reflectance distribution function corresponding to the appearance in printing from the pixel value (RGB value and ΔRΔGΔB value) of the RGB gloss data for each pixel of the RGB gloss data. For example, the reflectance distribution function calculation unit 50 calculates the reflectance distribution function as the following equation according to a reflection model of Phong.

$$I = Ii \cdot \{wd \cdot RGB \cdot \cos\theta i\} + Ii \cdot \{ws \cdot \Delta R\Delta G\Delta B \cdot \cos^n\gamma\} \qquad (4)$$

Here, I is reflected light intensity. $\{wd \cdot RGB \cdot \cos\theta i\}$ of the first term on the right side is a diffuse reflectance distribution function. Here, wd is a diffuse reflection weight coefficient, and RGB is a value read out from the color conversion table 33. θi is an incident angle. $\{ws \cdot \Delta R\Delta G\Delta B \cdot \cos^n\gamma\}$ of the second term on the right side is a mirror-surface reflectance distribution function. Here, ws is a mirror-surface reflection weight coefficient, and ΔRΔGΔB is a value read out from the color conversion table 33. γ is an angle formed by a mirror-surface reflection direction and a line-of-sight direction, and n is a mirror-surface reflection index.

FIG. 16B is a diagram showing a relationship between the incident angle θi and the angle γ formed by the mirror-surface reflection direction and the line-of-sight direction. Here, a vector N indicates the normal vector. A vector L indicates a light source direction vector, and a vector R indicates a reflection vector. Further, a vector V indicates a line-of-sight direction vector. Here, the vector R corresponds to the mirror-surface reflection direction, and the vector V corresponds to the line-of-sight direction.

The rendering unit 52 generates the CG image. In other words, the rendering unit 52 disposes the three-dimensional model of the printed matter corresponding to the image data on the virtual screen in the virtual three-dimensional space and determines the RGB value of each pixel configuring the surface of the three-dimensional model. Specifically, the rendering unit 52 determines the RGB value of each pixel configuring the surface of the three-dimensional model of the printed matter based on the reflectance distribution function calculated by the reflectance distribution function calculation unit 50 and the normal map, which is created by the normal map creation unit 34, as the layer thickness information. The rendering processing is known and may be executed by using, for example, a radiosity method or a ray tracing method taking into consideration inter-reflection.

The rendering unit 52 may use the height map such as the film thickness data, instead of the normal map, as the layer thickness information. In this case, the rendering unit 52 determines the RGB value of each pixel configuring the surface of the three-dimensional model of the printed matter, based on the reflectance distribution function calculated by the reflectance distribution function calculation unit 50 and the height map.

The display control unit 60 causes the display 90 as the display unit to perform the preview display of an image of the three-dimensional model generated by rendering. The three-dimensional model is a simulation image of the printed matter corresponding to the image data. The preview operation reception unit 42 receives, from a user, an operation (for example, operation of inclining printed matter) on the three-dimensional model of the printed matter in the virtual three-dimensional space. The display control unit 60 causes the display 90 to display the three-dimensional CG image that reflects the user operation received by the preview operation reception unit 42.

FIG. 15A is an example of the preview image of the present exemplary embodiment, and FIG. 15B is an example of the preview image in the related art. As shown in FIG. 15A, according to the present exemplary embodiment, the preview image having the stereoscopic feeling of the image forming material can be displayed.

The preview display technique described here is an example. Techniques of reproducing texture (glossy feeling, unevenness feeling, or the like) of an object surface by a three-dimensional CG are known, and a part or all of the techniques may be employed as appropriate in the present exemplary embodiment. A technique related to bidirectional reflectance distribution function (BRDF) may be employed.

Configuration of Image Processing System

The image processing system of the above exemplary embodiment is configured by using, for example, a general-purpose computer. The image processing system may be constructed as, for example, a single computer or a system consisting of a plurality of computers that cooperate with each other. As shown as an example in FIG. 17, for example, a computer, which is the base of the image processing system 10, has a circuit configuration in which a processor 1002, a memory (main storage device) 1004 such as a random access memory (RAM), a controller that controls an auxiliary storage device 1006 that is a non-volatile storage device such as a flash memory, a solid state drive (SSD), or a hard disk (HDD), an interface with various input and output devices 1008, a network interface 1010 that performs control for connection with a network, and the like are connected via a data transmission path such as a bus 1012. A program describing the content of the processing is installed in the computer through the network or the like and stored in the auxiliary storage device 1006. With execution of the program, which is stored in the auxiliary storage device 1006, by the processor 1002 using the memory 1004, the image processing system of the present exemplary embodiment is configured.

The program can be provided via a network such as the Internet and provided being stored in a computer-readable recording medium such as an optical disk or a USB memory.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Supplementary Note (((1)))

An image processing system comprising:

a processor configured to:

generate stereoscopic image data including information representing a layer thickness of an image forming material adhered to a recording medium based on image data of a printed image; and cause a display unit to display a preview image of a printed matter based on the stereoscopic image data, wherein the information representing the layer thickness of the image forming material includes information representing an aspect in which an edge of a swelling portion of the image forming material is inclined toward a recording medium surface or an aspect in which the edge of the swelling portion of the image forming material is rounded.

(((2)))

The image processing system according to (((1))), wherein the processor is configured to:

generate, based on the image data, film thickness data representing a height of the swelling portion of the image forming material;

perform, in the film thickness data, smoothing processing on the edge of the swelling portion of the image forming material to generate smoothed film thickness data; and generate, based on the smoothed film thickness data, the information representing the layer thickness of the image forming material.

(((3)))

The image processing system according to (((2))), wherein the processor is configured to:

execute, based on the height of the swelling portion of the image forming material in the film thickness data, the smoothing processing such that the image forming material is expanded around the edge of the swelling portion of the image forming material in the film thickness data to generate the smoothed film thickness data.

(((4)))

The image processing system according to (((1))), wherein the processor is configured to:

generate, based on the image data, film thickness data representing a height of the swelling portion of the image forming material;

generate a normal map based on the film thickness data; and perform, in the normal map, the smoothing processing on information representing the edge of the swelling portion of the image forming material to generate the information representing the layer thickness of the image forming material.

(((5)))

The image processing system according to any one of (((1))) to (((4))), wherein the processor is configured to:

generate the information representing the layer thickness of the image forming material based on the image data and a printing condition of the printed matter.

(((6)))

The image processing system according to (((5))), wherein the printing condition includes the number of times of additional printing of the printed matter.

(((7)))

The image processing system according to (((5))), wherein the printing condition includes a type of toner used for the printed matter.

(((8)))

The image processing system according to (((5))), wherein the printing condition includes a type of recording medium used for the printed matter.

(((9)))

The image processing system according to (((5))), wherein the printing condition includes a printing method of a printing device that creates the printed matter.

(((10)))

The image processing system according to any one of (((1))) to (((3))), wherein the information representing the layer thickness of the image forming material includes a height map.

(((11)))

The image processing system according to any one of (((1))) to (((9))), wherein the information representing the layer thickness of the image forming material includes a normal map.

(((12)))

A program that causes a computer to execute a process comprising:

generating stereoscopic image data including information representing a layer thickness of an image forming material adhered to a recording medium based on image data of a printed image; and causing a display unit to display a preview image of a printed matter based on the stereoscopic image data, wherein the information representing the layer thickness of the image forming material includes information representing an aspect in which an edge of a swelling portion of the image forming material is inclined toward a recording medium surface or an aspect in which the edge of the swelling portion of the image forming material is rounded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:

a processor configured to:

generate stereoscopic image data including information representing a layer thickness of an image forming material adhered to a recording medium based on image data of a printed image;

generate, based on the image data, film thickness data representing a height of the swelling portion of the image forming material;

perform, in the film thickness data, smoothing processing on the edge of the swelling portion of the image forming material to generate smoothed film thickness data;

generate, based on the smoothed film thickness data, the information representing the layer thickness of the image forming material; and cause a display unit to display a preview image of a printed matter based on the stereoscopic image data, wherein the information representing the layer thickness of the image forming material includes information representing an aspect in which an edge of a swelling portion of the image forming material is inclined toward a recording medium surface or an aspect in which the edge of the swelling portion of the image forming material is rounded.

2. The image processing system according to claim 1, wherein the processor is configured to:

execute, based on the height of the swelling portion of the image forming material in the film thickness data, the smoothing processing such that the image forming material is expanded around the edge of the swelling portion of the image forming material in the film thickness data to generate the smoothed film thickness data.

3. The image processing system according to claim 2, wherein the processor is configured to:

generate the information representing the layer thickness of the image forming material based on the image data and a printing condition of the printed matter.

4. The image processing system according to claim 3, wherein the printing condition includes the number of times of additional printing of the printed matter.

5. The image processing system according to claim 1, wherein the processor is configured to:

generate, based on the image data, film thickness data representing a height of the swelling portion of the image forming material;

generate a normal map based on the film thickness data; and perform, in the normal map, the smoothing processing on information representing the edge of the swelling portion of the image forming material to generate the information representing the layer thickness of the image forming material.

6. The image processing system according to claim 5, wherein the processor is configured to:

generate the information representing the layer thickness of the image forming material based on the image data and a printing condition of the printed matter.

7. The image processing system according to claim 6, wherein the printing condition includes the number of times of additional printing of the printed matter.

8. The image processing system according to claim 1, wherein the processor is configured to:

generate the information representing the layer thickness of the image forming material based on the image data and a printing condition of the printed matter.

9. The image processing system according to claim 8, wherein the printing condition includes the number of times of additional printing of the printed matter.

10. The image processing system according to claim 8, wherein the printing condition includes a type of toner used for the printed matter.

11. The image processing system according to claim 8, wherein the printing condition includes a type of recording medium used for the printed matter.

12. The image processing system according to claim 8, wherein the printing condition includes a printing method of a printing device that creates the printed matter.

13. The image processing system according to claim 1, wherein the information representing the layer thickness of the image forming material includes a height map.

14. The image processing system according to claim 1, wherein the information representing the layer thickness of the image forming material includes a normal map.

15. A non-transitory computer readable medium storing a program that causes a computer to execute a process comprising:

generating stereoscopic image data including information representing a layer thickness of an image forming material adhered to a recording medium based on image data of a printed image;

generating, based on the image data, film thickness data representing a height of the swelling portion of the image forming material;

performing, in the film thickness data, smoothing processing on the edge of the swelling portion of the image forming material to generate smoothed film thickness data;

generating, based on the smoothed film thickness data, the information representing the layer thickness of the image forming material; and causing a display unit to display a preview image of a printed matter based on the stereoscopic image data, wherein the information representing the layer thickness of the image forming material includes information representing an aspect in which an edge of a swelling portion of the image forming material is inclined toward a recording medium surface or an aspect in which the edge of the swelling portion of the image forming material is rounded.

16. An image processing method comprising:

generating stereoscopic image data including information representing a layer thickness of an image forming material adhered to a recording medium based on image data of a printed image;

generating, based on the image data, film thickness data representing a height of the swelling portion of the image forming material;

performing, in the film thickness data, smoothing processing on the edge of the swelling portion of the image forming material to generate smoothed film thickness data;

generating, based on the smoothed film thickness data, the information representing the layer thickness of the image forming material; and causing a display unit to display a preview image of a printed matter based on the stereoscopic image data, wherein the information representing the layer thickness of the image forming material includes information representing an aspect in which an edge of a swelling portion of the image forming material is inclined toward a recording medium surface or an aspect in which the edge of the swelling portion of the image forming material is rounded.

* * * * *